(12) United States Patent
Aoki et al.

(10) Patent No.: US 11,073,190 B2
(45) Date of Patent: Jul. 27, 2021

(54) CYLINDER APPARATUS

(71) Applicant: HITACHI AUTOMOTIVE SYSTEMS, LTD., Ibaraki (JP)

(72) Inventors: Yasuhiro Aoki, Yokohama (JP); Umi Tanabe, Kawasaki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 224 days.

(21) Appl. No.: 16/473,334

(22) PCT Filed: Dec. 26, 2017

(86) PCT No.: PCT/JP2017/046791
§ 371 (c)(1),
(2) Date: Jun. 25, 2019

(87) PCT Pub. No.: WO2018/124136
PCT Pub. Date: Jul. 5, 2018

(65) Prior Publication Data
US 2020/0102998 A1    Apr. 2, 2020

(30) Foreign Application Priority Data

Dec. 26, 2016 (JP) .............................. JP2016-251035

(51) Int. Cl.
*F16F 9/53* (2006.01)
*F16F 9/18* (2006.01)
(Continued)

(52) U.S. Cl.
CPC .............. *F16F 9/532* (2013.01); *F16F 9/185* (2013.01); *F16F 9/3257* (2013.01); *F16F 9/369* (2013.01);
(Continued)

(58) Field of Classification Search
CPC ............... F16F 2232/06; F16F 15/0235; F16F 2232/02; F16F 9/3405; F16F 9/346;
(Continued)

(56) References Cited

U.S. PATENT DOCUMENTS 2,661,596 A * 12/1953 Winslow ................. H01F 1/447
60/326
3,302,756 A * 2/1967 Mcintyre .............. F16F 9/3415
188/315
(Continued)

FOREIGN PATENT DOCUMENTS

JP    62064517 A * 3/1987 ................ F16F 9/53
JP    7-54917        2/1995
(Continued)

OTHER PUBLICATIONS

International Search Report dated Apr. 3, 2018 in International (PCT) Application No. PCT/JP2017/046791 with English translation.
(Continued)

*Primary Examiner* — Robert A. Siconolfi
*Assistant Examiner* — Mahbubur Rashid
(74) *Attorney, Agent, or Firm* — Wenderoth, Lind & Ponack, L.L.P.

(57) ABSTRACT

Electrorheological fluid is loaded in a shock absorber (1) as hydraulic fluid (2). The shock absorber (1) controls a generated damping force by causing a potential difference to be generated in an electrode passage (19) and controlling a viscosity of the electrorheological fluid passing through this electrode passage (19). A plurality of partition walls (20) is provided between an inner cylinder (3) and an electrode cylinder (18). By being configured in this manner, the shock absorber (1) forms a plurality of helical flow passages (21) between the inner cylinder (3) and the electrode cylinder
(Continued)

(18). In this case, an inclination angle of each of the partition walls (20) is not constant, and each of the partition walls (20) includes a sharply inclined portion (20A) inclined at a large angle on at least an entrance side of an extension-side flow passage (21).

9 Claims, 11 Drawing Sheets

(51) Int. Cl.
  *F16F 9/32* (2006.01)
  *F16F 9/36* (2006.01)
  *B60G 13/08* (2006.01)
  *B61F 5/12* (2006.01)
  *F16F 9/06* (2006.01)

(52) U.S. Cl.
  CPC .......... *B60G 13/08* (2013.01); *B60G 2202/24* (2013.01); *B60G 2206/41* (2013.01); *B60G 2500/10* (2013.01); *B60G 2800/162* (2013.01); *B61F 5/127* (2013.01); *F16F 9/062* (2013.01); *F16F 9/064* (2013.01); *F16F 9/535* (2013.01); *F16F 2222/12* (2013.01); *F16F 2224/043* (2013.01); *F16F 2228/066* (2013.01); *F16F 2234/02* (2013.01)

(58) Field of Classification Search
  CPC .... F16F 2222/12; F16F 2224/04; F16F 9/064; F16F 9/12; F16F 9/145; F16F 9/062; F16F 9/34; F16F 9/46; F16F 9/48; F16F 9/532; B60G 2202/24; B60G 2500/104; B60G 13/08; B60G 17/016; B60G 17/08
  See application file for complete search history.

(56) References Cited

U.S. PATENT DOCUMENTS

| | | | | |
|---|---|---|---|---|
| 4,059,175 A * | 11/1977 | Dressell, Jr. | ............ | F16F 9/346 188/285 |
| 4,298,101 A * | 11/1981 | Dressell, Jr. | .............. | F16F 9/48 188/285 |
| 4,452,233 A * | 6/1984 | Goodman, Jr. | ......... | F28F 13/12 126/653 |
| 4,554,908 A * | 11/1985 | Hanlet | .................... | F24S 10/45 126/652 |
| 5,006,299 A * | 4/1991 | Gozani | .................... | G01T 3/06 376/159 |
| 5,018,606 A * | 5/1991 | Carlson | ................... | F16F 9/532 188/267.1 |
| 5,159,997 A * | 11/1992 | Heideman | ............... | F16F 9/003 188/282.1 |
| 5,259,487 A * | 11/1993 | Petek | ...................... | F16F 9/532 188/267.1 |
| 5,263,558 A * | 11/1993 | Yamaoka | ........... | B60G 17/0157 188/267 |
| 5,590,745 A * | 1/1997 | Rensel | .................... | F16F 9/532 188/267.1 |
| 6,637,427 B1 * | 10/2003 | Yeomans | ................ | F24S 70/60 126/675 |
| 6,974,002 B2 * | 12/2005 | Heideman | ............... | F16F 9/346 188/285 |
| 9,133,902 B2 * | 9/2015 | Spyche, Jr. | ............. | F16F 9/346 |
| 2010/0066051 A1 * | 3/2010 | Haugen | .................... | F03G 1/00 280/124.157 |
| 2014/0305618 A1 * | 10/2014 | Newton | ................ | A23G 9/045 165/154 |
| 2016/0059656 A1 | 3/2016 | Funke et al. | | |

FOREIGN PATENT DOCUMENTS

| | | |
|---|---|---|
| JP | 3294398 B2 * | 6/2002 |
| JP | 2004-316797 | 11/2004 |
| JP | 2016-515184 | 5/2016 |
| WO | 2014/135183 | 9/2014 |
| WO | WO-2017057214 A1 * | 4/2017 ................ F16F 9/53 |

OTHER PUBLICATIONS

Written Opinion of the International Searching Authority dated Apr. 3, 2018 in International (PCT) Application No. PCT/JP2017/046791 with English translation.

* cited by examiner

CYLINDER APPARATUS

TECHNICAL FIELD

The present invention relates to a cylinder apparatus preferably used to absorb a vibration of a vehicle such as an automobile and a railway train.

BACKGROUND ART

Generally, a vehicle such as an automobile is provided with a cylinder apparatus represented by a hydraulic shock absorber between a vehicle body (sprung) side and each wheel (unsprung) side. Then, PTL 1 discloses such a configuration that a damper (shock absorber) using electrorheological fluid as working fluid thereof is provided with helical members between an inner cylinder and an electrode cylinder (an intermediate cylinder), and a portion between the helical members is used as a flow passage.

CITATION LIST

Patent Literature

[PTL 1] International Publication No. 2014-135183

SUMMARY OF INVENTION

In the case of the configuration disclosed in PTL 1, i.e., the configuration using the portion between the helical members as the flow passage, a damping force characteristic may be disturbed.

An object of the present invention is to provide a cylinder apparatus capable of preventing or reducing the disturbance of the damping force characteristic.

To achieve the above-described object, a cylinder apparatus according to one aspect of the present invention sealingly contains functional fluid having a fluid property changing according to an electric field, and includes a rod inserted therein. The cylinder apparatus includes an inner cylinder electrode and an outer cylinder electrode provided outside this inner cylinder electrode. The inner cylinder electrode and the outer cylinder electrode serve as electrodes of potentials different from each other. The cylinder apparatus further includes one or a plurality of flow passage formation unit(s) provided between the inner cylinder electrode and the outer cylinder electrode. The one or plurality of flow passage formation unit(s) form(s) a plurality of flow passages through which the functional fluid flows at least according to an extension-side movement of the rod from one end side toward an opposite end side in an axial direction. The flow passages formed by the one or plurality of flow passage formation unit(s) are each a helical or serpentine flow passage having a circumferentially extending portion, and provided in such a manner that an effective cross-sectional area of the flow passage on at least one of an entrance and an exit is large compared to an effective cross-sectional area of an intermediate portion of this flow passage.

According to the cylinder apparatus of the present invention, the disturbance of the damping force characteristic can be prevented or reduced.

DESCRIPTION OF EMBODIMENTS

In the following description, cylinder apparatuses according to embodiments of the present invention will be described with reference to the accompanying drawings based on an example in which the cylinder apparatuses are applied to a shock absorber mounted on a vehicle such as a four-wheeled automobile.

Figure 1:
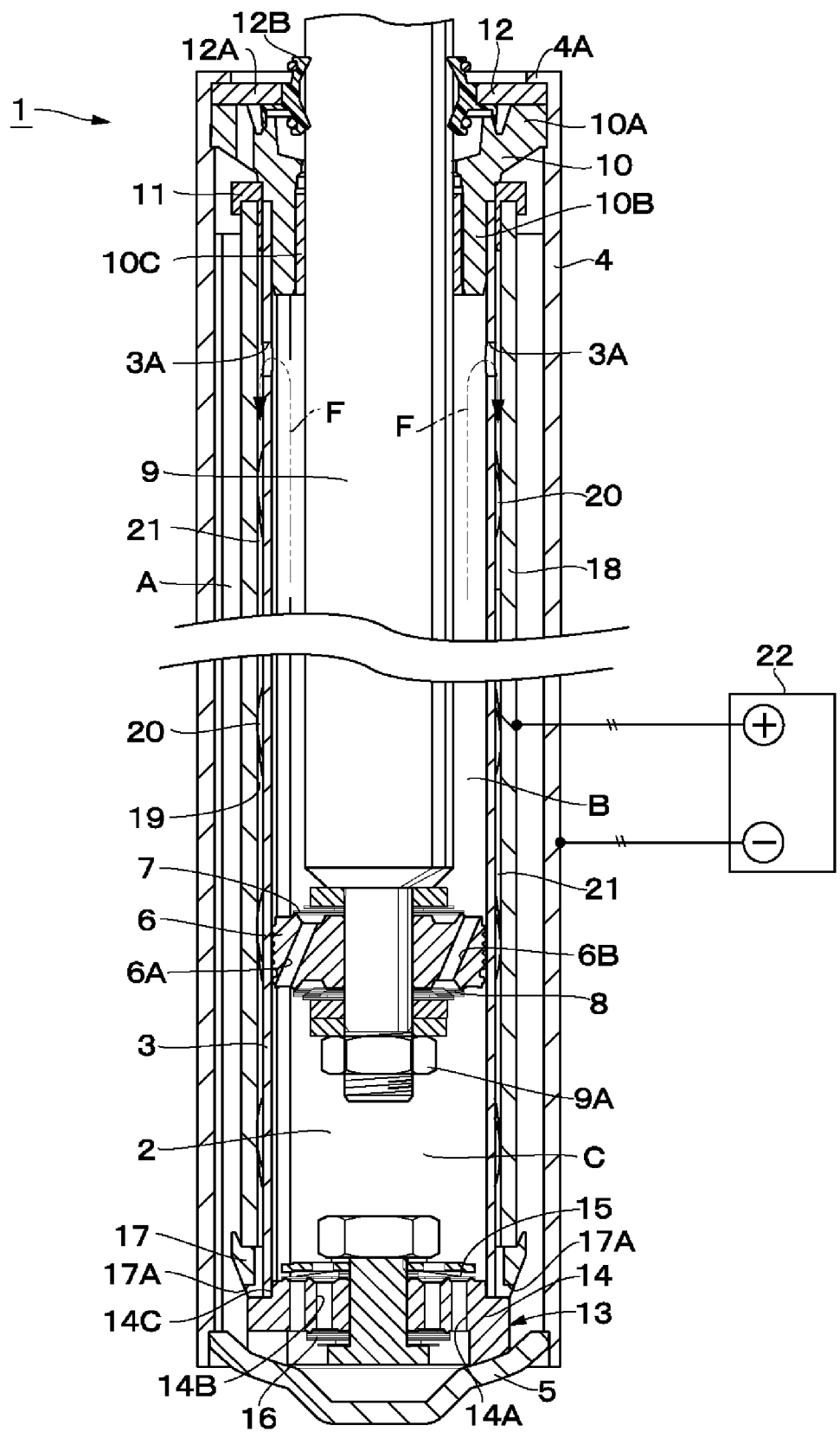
FIG. 1 is a vertical cross-sectional view illustrating a shock absorber as a cylinder apparatus according to a first embodiment.
Figure 2:
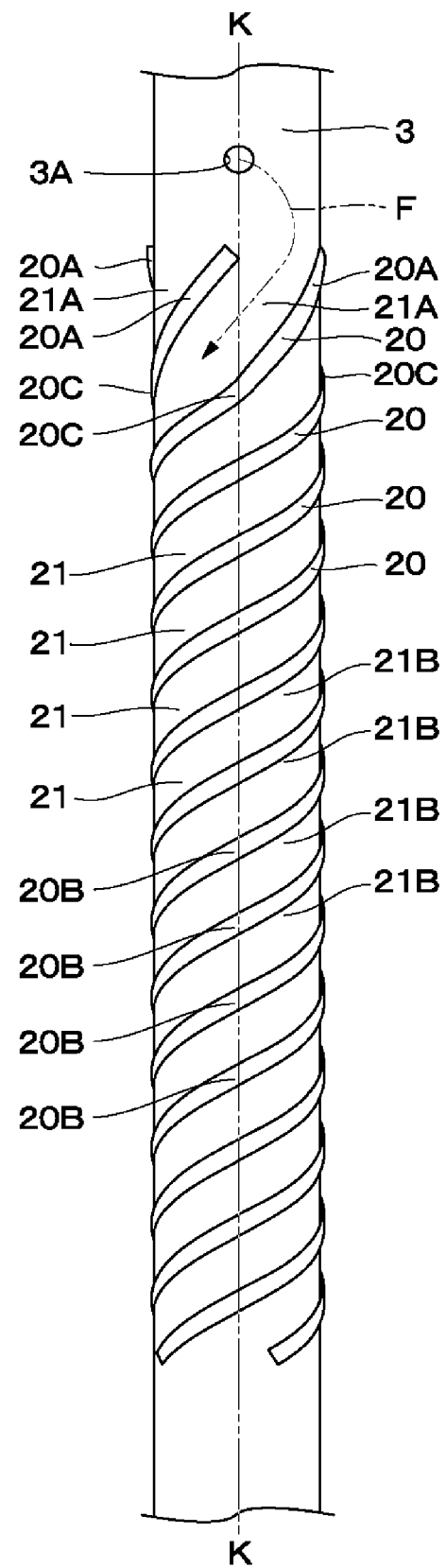
FIG. 2 is a front view illustrating an inner cylinder and a seal unit (a partition wall).
Figure 3:
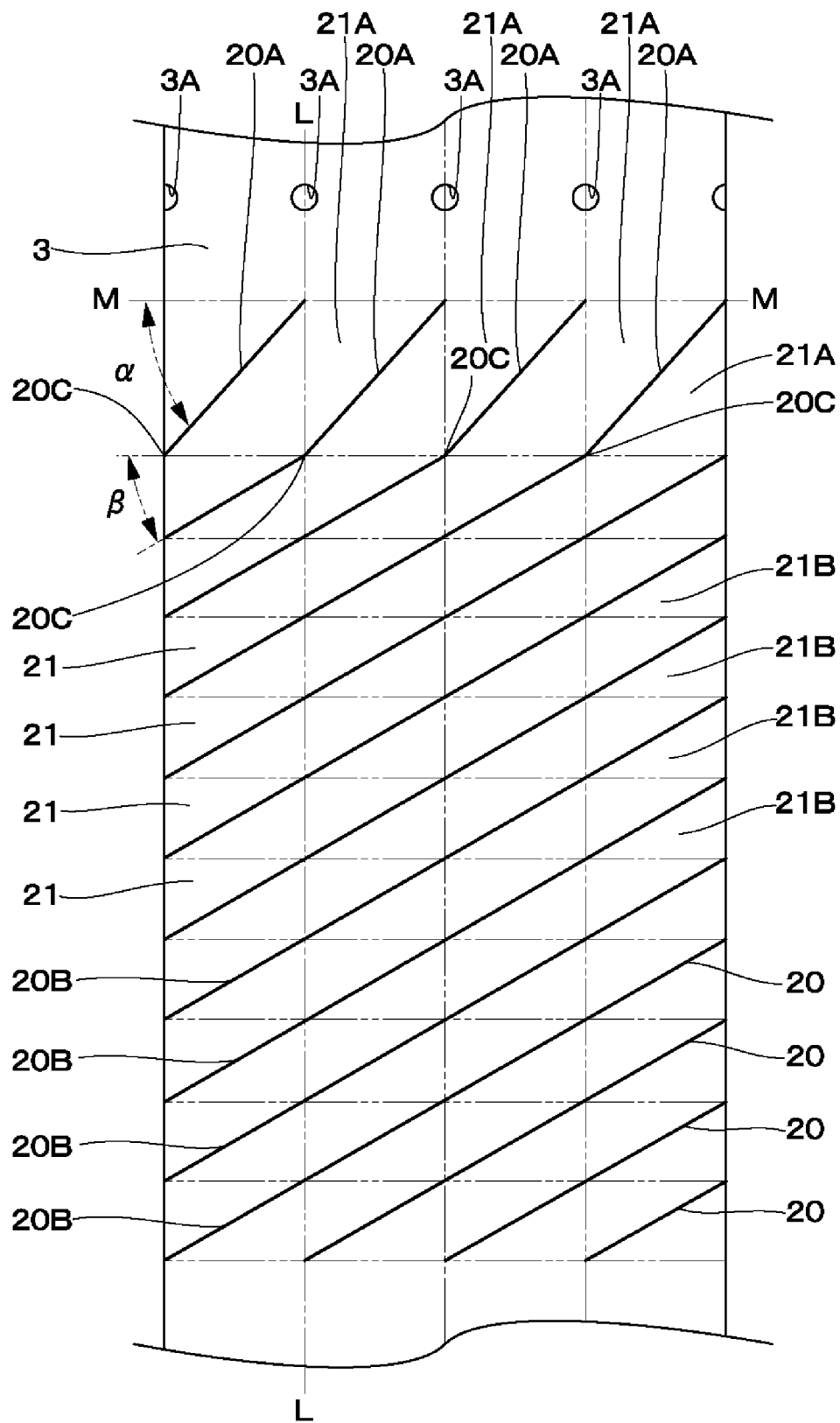
FIG. 3 illustrates the inner cylinder and the seal unit in a developed manner.

FIGS. 1 to 3 illustrate a first embodiment. In FIG. 1, a shock absorber 1 as a cylinder apparatus is configured as a damping force adjustable hydraulic shock absorber (a semi-active damper) using functional fluid (i.e., electrorheological fluid) as hydraulic fluid 2 such as hydraulic oil sealingly contained in the shock absorber 1. The shock absorber 1 forms a suspension apparatus for the vehicle together with, for example, a suspension spring (not illustrate) embodied by a coil spring. In the following description, the shock absorber 1 will be described assuming that one axial end side and an opposite axial end side of the shock absorber 1 refer to an "upper end" side and a "lower end" side, respectively, but the one axial end side and the opposite axial end side of the shock absorber 1 may be the "lower end" side and the "upper end" side, respectively.

The shock absorber 1 includes an inner cylinder 3, an outer cylinder 4, a piston 6, a piston rod 9, a bottom valve 13, an electrode cylinder 18, and the like. The inner cylinder 3 is formed as an axially extending cylindrical cylinder member, and sealingly contains therein the hydraulic fluid 2, which is the functional fluid. Further, the piston rod 9 is inserted inside the inner cylinder 3, and the outer cylinder 4 and the electrode cylinder 18 are coaxially provided outside the inner cylinder 3. In the present embodiment, the inner cylinder 3 and the electrode cylinder 18 are set as an inner cylinder electrode and an outer cylinder electrode, respectively.

The inner cylinder 3 has a lower end side fittedly attached to a valve body 14 of the bottom valve 13 and an upper end side fittedly attached to a rod guide 10. On the inner cylinder 3, a plurality of (for example, four) oil holes 3A, which is in constant communication with an electrode passage 19, is formed so as to be spaced apart circumferentially as radial horizontal holes. In other words, a rod-side oil chamber B in the inner cylinder 3 is in communication with the electrode passage 19 via the oil holes 3A.

The outer cylinder 4 forms an outer shell of the shock absorber 1, and is formed as a cylindrical member. The outer cylinder 4 is provided externally around the inner cylinder 3 and the electrode cylinder 18, and forms a reservoir chamber A in communication with the electrode passage 19 between the outer cylinder 14 and this electrode cylinder 18. In this case, the outer cylinder 4 has, on a lower end side thereof, a closed end closed by a bottom cap 5 with use of a welding method or the like. The bottom cap 5 forms a base member together with the valve body 14 of the bottom valve 13.

An upper end side of the outer cylinder 4 is configured as an opening end. For example, a swaged portion 4A is formed on the opening end side of the outer cylinder 4 by bending the outer cylinder 4 radially inwardly. The swaged portion 4A holds an outer peripheral side of an annular plate body 12A of a seal member 12 with the annular plate body 12A prevented from being detached off.

Now, the inner cylinder 3 and the outer cylinder 4 form a cylinder, and the hydraulic fluid 2 is sealingly contained in this cylinder. In the present embodiment, the electrorheological fluid (ERF: Electro Rheological Fluid), which is one kind of functional fluid, is used as fluid loaded (sealingly contained) in the cylinder, i.e., the hydraulic fluid 2 that is the hydraulic oil. FIGS. 1 and 2 illustrate the sealingly contained hydraulic fluid 2 in a colorless and transparent manner.

The electrorheological fluid is fluid (the functional fluid) having a property changing according to an electric field (a voltage). More specifically, the electrorheological fluid has a viscosity changing according to an applied voltage, and thus exhibits a flow resistance (a damping force) changing according thereto. The electrorheological fluid includes, for example, base oil (base fluid) embodied by silicon oil or the like, and particles (fine particles) mixed (distributed) in this base oil and making the viscosity changeable according to a change in the electric field.

As will be described below, the shock absorber 1 is configured to control (adjust) a generated damping force by causing a potential different to be generated in the electrode passage 19 between the inner cylinder 3 and the electrode cylinder 18 and controlling the viscosity of the electrorheological fluid passing through this electrode passage 19. In the present embodiment, the shock absorber 1 will be described assuming that the electrorheological fluid (the ER fluid) is used as the functional fluid by way example. However, for example, magnetic fluid (MR fluid) having a fluid property changing according to a magnetic field may be used as the functional fluid.

The annular reservoir chamber A serving as a reservoir is formed between the inner cylinder 3 and the outer cylinder 4, more specifically, between the electrode cylinder 18 and the outer cylinder 4. Gas serving as working gas is sealingly contained together with the hydraulic fluid 2 in the reservoir chamber A. This gas may be air in an atmospheric pressure state, or gas such as compressed nitrogen gas may be used as it. At the time of compression (a compression stroke) of the piston rod 9, the gas in the reservoir chamber A is compressed so as to compensate for a volume of an entry of this piston rod 9.

The piston 6 is slidably provided in the inner cylinder 3. The piston 6 divides the inside the inner cylinder 3 into the rod-side oil chamber B serving as a first chamber and a bottom-side oil chamber C serving as a second chamber. A plurality of oil passages 6A and a plurality of oil passages 6B are each formed on the piston 6 so as to be circumferentially spaced apart from one another. The oil passages 6A and 6B can establish communication between the rod-side oil chamber B and the bottom-side oil chamber C.

Then, the shock absorber 1 according to the embodiment has a uniflow structure. Therefore, the hydraulic fluid 2 in the inner cylinder 3 flows from the rod-side oil chamber B (i.e., the oil holes 3A of the inner cylinder 3) toward the electrode passage 19 constantly unidirectionally (i.e., in a direction of an arrow F indicated by an alternate long and two short dashes line in FIG. 1) during both the compression stroke and an extension stroke of the piston rod 9.

To realize such a uniflow structure, for example, a compression-side check valve 7 is provided on an upper end surface of the piston 6. The compression-side check valve 7 is opened when the piston 6 is slidably displaced downward in the inner cylinder 3 during the compression stroke (inward stroke) of the piston rod 9, and otherwise is closed. The compression-side check valve 7 permits the oil fluid (the hydraulic fluid 2) in the bottom-side oil chamber C to flow through each of the oil passages 6A toward the rod-side oil chamber B, and prohibits the oil fluid from flowing in an opposite direction therefrom. In other words, the compression-side check valve 7 permits only a flow of the hydraulic fluid 2 directed from the bottom-side oil chamber C toward the rod-side oil chamber B.

For example, an extension-side disk valve 8 is provided on a lower end surface of the piston 6. The extension-side disk valve 8 is opened upon exceedance of a pressure in the rod-side oil chamber B over a relief setting value when the piston 6 is slidably displaced upward in the inner cylinder 3 during the extension stroke (an outward stroke) of the piston rod 9, and relieves a pressure at this time by releasing it to the bottom-side oil chamber C side via each of the oil passages 6B.

The piston rod 9 as a rod extends in the inner cylinder 3 in an axial direction (the same direction as central axes of the inner cylinder 3 and the outer cylinder 4, and thus the shock absorber 1, and a vertical direction in FIGS. 1 and 2). More specifically, the piston rod 9 has a lower end coupled (fixed) to the piston 6 in the inner cylinder 3, and an upper end passing through the rod-side oil chamber B to extend out of the inner cylinder 3 and the outer cylinder 4. In this case, the piston 6 is fixed (fixedly attached) to the lower end side of the piston rod 9 with use of a nut 9A and the like. On the other hand, the upper end side of the piston rod 9 protrudes outward via the rod guide 10. The piston rod 9 may be configured as a so-called double rod by further elongating the lower end of the piston rod 9 to cause it to protrude outward from a bottom portion (for example, the bottom cap 5) side.

The stepped cylindrical rod guide 10 is fittedly provided on the upper end sides of the inner cylinder 3 and the outer cylinder 4 so as to close the upper end sides of these inner cylinder 3 and outer cylinder 4. The rod guide 10 functions to support the piston rod 9, and is formed as a cylindrical member having a predetermined shape by performing molding processing, cutting processing, or the like on, for example, a metallic material or a rigid resin material. The rod guide 10 positions the upper portion of the inner cylinder 3 and the upper portion of the electrode cylinder 18 at a center of the outer cylinder 4. Along therewith, an inner peripheral side of the rod guide 10 axially slidably leads (guides) the piston rod 9.

Now, the rod guide 10 is formed into a stepped cylindrical shape defined by an annular large-diameter portion 10A and a short tubular small-diameter portion 10B. The large-diameter portion 10A is located on an upper side, and is fittedly inserted on an inner peripheral side of the outer cylinder 4. The small-diameter portion 10B is located on a lower end side of this large-diameter portion 10A, and is fittedly inserted on an inner peripheral side of the inner cylinder 3. A guide portion 100 is provided on an inner peripheral side of the small-diameter portion 10B of the rod guide 10. The guide portion 100 axially slidably guides the piston rod 9. The guide portion 100 is formed by, for example, coating an inner peripheral surface of a metallic cylinder with tetrafluoroethylene.

On the other hand, an annular holding member 11 is fittedly attached on an outer peripheral side of the rod guide 10 and between the large-diameter portion 10A and the small-diameter portion 10B. The holding member 11 holds the upper end side of the electrode cylinder 18 in an axially positioned state. The holding member 11 is made from, for example, an electric insulating material (an isolator), and holds the inner cylinder 3 and the rod guide 10, and the electrode cylinder 18 in a state electrically insulated therebetween.

The annular seal member 12 is provided between the large-diameter portion 10A of the rod guide 10 and the swaged portion 4A of the outer cylinder 4. The seal member 12 includes the metallic annular plate body 12A, and an elastic body 12B made from an elastic material such as rubber. The annular plate body 12A includes at a center thereof a hole through which the piston rod 9 is inserted. The elastic body 12B is fixedly attached to this annular plate body 12A by a method such as baking. The seal member 12 liquid-tightly or air-tightly sealingly separates (seals) between the cylinder and the piston rod 9 due to a sliding contact of an inner periphery of the elastic body 12B with an outer peripheral side of the piston rod 9.

The bottom valve 13 is provided on the lower end side of the inner cylinder 3 at a position between this inner cylinder 3 and the bottom cap 5. The bottom valve 13 functions to establish/block communication between the bottom-side oil chamber C and the reservoir chamber A. Therefore, the bottom valve 13 includes the valve body 14, an extension-side check valve 15, and a disk valve 16. The valve body 14 defines the reservoir chamber A and the bottom-side oil chamber C between the bottom cap 5 and the inner cylinder 3.

Oil passages 14A and 14B are each formed on the valve body 14 so as to be circumferentially spaced apart from one another. The oil passages 14A and 14B can establish communication between the reservoir chamber A and the bottom-side oil chamber C. A stepped portion 14C is formed on an outer peripheral side of the valve body 14, and an inner peripheral side of the lower end of the inner cylinder 3 is fittedly fixed to this stepped portion 14C. Further, an annular holding member 17 is attached to the stepped portion 14C fittedly to an outer peripheral side of the inner cylinder 3.

The extension-side check valve 15 is provided on, for example, an upper surface side of the valve body 14. The extension-side check valve 15 is opened when the piston 6 is slidably displaced upward during the extension stroke of the piston rod 9, and otherwise is closed. The extension-side check valve 15 permits the oil fluid (the hydraulic fluid 2) in the reservoir chamber A to flow through inside each of the oil passages 14A toward the bottom-side oil chamber C, and prohibits the oil fluid from flowing in an opposite direction therefrom. In other words, the extension-side check valve 15 permits only the flow of the hydraulic fluid 2 directed from the reservoir chamber A side toward the bottom-side oil chamber C.

The compression-side disk valve 16 is provided on, for example, a lower surface side of the valve body 14. The compression-side disk valve 16 is opened upon exceedance of a pressure in the bottom-side oil chamber C over a relief setting value when the piston 6 is slidably displaced downward during the compression stroke of the piston rod 9, and relieves a pressure at this time by releasing it to the reservoir chamber A side via each of the oil passages 14B.

The holding member 17 holds a lower end side of the electrode cylinder 18 in an axially positioned state. The holding member 17 is made from, for example, an electric insulating material (an isolator), and holds the inner cylinder 3 and the valve body 14, and the electrode cylinder 18 in a state electrically insulated therebetween. Further, a plurality of oil passages 17A is formed on the holding member 17. The oil passages 17A establish communication of the electrode passage 19 with the reservoir chamber A.

The electrode cylinder 18, which is made of an axially extending pressure pipe, is provided outside the inner cylinder 3, i.e., between the inner cylinder 3 and the outer cylinder 4. The electrode cylinder 18 serves as an intermediate cylinder between the inner cylinder 3 and the outer cylinder 4, and corresponds to a cylindrical outer cylinder electrode. The electrode cylinder 18 is made with use of a conductive material, and forms a cylindrical electrode. The electrode cylinder 18 defines the electrode passage 19 in communication with the rod-side oil chamber B between the electrode cylinder 18 and the inner cylinder 3.

In other words, the electrode cylinder 18 is attached via the holding members 11 and 17 provided so as to be axially (vertically) spaced apart from each other on the outer peripheral side of the inner cylinder 3. The electrode cylinder 18 defines an annular passage inside the electrode cylinder 18 (between an inner peripheral side of the electrode cylinder 18 and the outer peripheral side of the inner cylinder 3), i.e., the electrode passage 19 as an intermediate passage through which the hydraulic fluid 2 flows by surrounding the outer peripheral side of the inner cylinder 3 along an entire circumference thereof. A plurality of flow passages 21 is formed in the electrode passage 19 (i.e., between the outer peripheral surface of the inner cylinder 3 and the inner peripheral surface of the electrode cylinder 18) by a plurality of partition walls 20.

The electrode passage 19 is in constant communication with the rod-side oil chamber B via the oil holes 3A formed as the radial horizontal holes on the inner cylinder 3. More specifically, in the shock absorber 1, the hydraulic fluid 2 flows from the rod-side oil chamber B into the electrode passage 19 via the oil holes 3A during both the compression stroke and the extension stroke of the piston 6 as indicated by the arrow F representing the direction of the flow of the hydraulic fluid 2 in FIG. 1. When the piston rod 9 enters into and exits from the inside of the inner cylinder 3 (i.e., while the piston rod 9 repeats the compression stroke and the extension stroke), the hydraulic fluid 2 introduced into the electrode passage 19 flows from an axial upper end side toward an axial lower end side of the electrode passage 19 due to this entering and exiting movements.

At this time, the hydraulic fluid 2 in the electrode passage 19 flows in the flow passages 21 between the individual partition walls 20 while being guided by each of the partition walls 20. More specifically, the hydraulic fluid 2 flows from inside the inner cylinder 3 into the electrode passage 19 and flows from one axial side toward an opposite axial side in the flow passages 21 due to extension-side and compression-side movements of the piston rod 9. Then, the hydraulic fluid 2 introduced into the electrode passage 19 flows out from the lower end side of the electrode cylinder 18 into the reservoir chamber A via the oil passages 17A of the holding member 17.

The electrode passage 19 applies a resistance to the fluid flowing due to the sliding movement of the piston 6 in the outer cylinder 4 and the inner cylinder 3, i.e., the electrorheological fluid serving as the hydraulic fluid 2. To exert this function, the electrode cylinder 18 is connected to a positive electrode of a battery 22 serving as a power source via, for example, a high-voltage driver (not illustrated) that generates a high voltage. The battery 22 (and the high-voltage battery) serves as a voltage supply portion (an electric field supply portion), and the electrode cylinder 18 serves as an electrode (an electric conductor) that provides the electric field (the voltage) to the hydraulic fluid 2, which is the fluid in the electrode passage 19, i.e., the electrorheological fluid as the functional fluid. In this case, both the end sides of the electrode cylinder 18 are electrically insulated by the electrically insulating holding members 11 and 17. On the other hand, the inner cylinder 3 is connected to a negative electrode (ground) via the rod guide 10, the bottom valve 13, the bottom cap 5, the outer cylinder 4, a high-voltage driver, or the like.

The high-voltage driver increases a direct-current voltage output from the battery 22 to supply (output) it to the electrode cylinder 18 based on an instruction (a high-voltage instruction) output from a controller (not illustrated) for variably adjusting the damping force of the shock absorber 1. This causes generation of a potential difference according to the voltage applied to the electrode cylinder 18 between the electrode cylinder 18 and the inner cylinder 3, i.e., in the electrode passage 19, and thus causes a change in the viscosity (a resistive force or a shear stress) of the hydraulic fluid 2 that is the electrorheological fluid. In this case, the shock absorber 1 can continuously adjust a characteristic of the generated damping force (a damping force characteristic) from a high (strong) characteristic (a hard characteristic) to a low (weak) characteristic (a soft characteristic) according to the voltage applied to the electrode cylinder 18. The shock absorber 1 may be able to adjust the damping force characteristic through two steps or a plurality of steps without being limited to continuously adjusting the damping force characteristic.

Now, PTL 1 discloses the configuration in which the helical members are provided between the inner cylinder and the electrode cylinder, and the portion between the helical members is used as the flow passage. In this case, the damping force characteristic may be disturbed, i.e., may be generated unevenly. More specifically, a damping force variable range of the shock absorber mainly depends on a length of the flow passage formed by the helical members between the outer cylinder and the inner cylinder. Therefore, if a further wide damping force variable range is desired to be acquired, the helical members should be installed with a reduced angle (a pitch) (a reduced inclined angle) and an increased flow passage length. However, only simply reducing the angle of the helical members may result in deviation of a waveform of the damping force from a desired waveform. More specifically, the damping force may be disturbed due to an inflow of the hydraulic fluid into the flow passage without the flow thereof adjusted when the extension stroke and the compression stroke of the shock absorber are switched.

On the other hand, in the first embodiment, the partition walls 20 corresponding to the helical members are configured in the following manner. In the following description, the partition walls 20 according to the first embodiment will be described also with reference to FIGS. 2 and 3 in addition to FIG. 1.

The plurality of (four) partition walls 20 as flow passage formation units (seal members) is provided between the inner cylinder 3 and the electrode cylinder 18. Each of the partition walls 20 includes a sharply inclined portion 20A and a mildly inclined portion 20B, and extends circumferentially obliquely between the inner cylinder 3 and the electrode cylinder 18. The partition walls 20 form a plurality of (four) flow passages 21 between the inner cylinder 3 and the electrode cylinder 18, i.e., in the electrode passage 19. In other words, each of the partition walls 20 functions to divide the flow of the hydraulic fluid 2 into the plurality of flow passages 21 (guide the flow of the hydraulic fluid 2) between the inner peripheral side of the electrode cylinder 18 and the outer peripheral side of the inner cylinder 3.

The hydraulic fluid 2 flows from the axial upper end side toward the axial lower end side in each of the flow passages 21 according to the entering and exiting movements of the piston rod 9. As illustrated in FIG. 2, each of the partition walls 20 is formed into a helical shape having a circumferentially extending portion (the sharply inclined portion 20A and the mildly inclined portion 20B). Due to this configuration, the flow passage 21 formed between the partition walls 20 adjacent to each other is also prepared as a helical flow passage having a circumferentially extending portion (a sharply inclined flow passage 21A and a mildly inclined flow passage 21B) by the plurality of helically extending partition walls 20. In other words, each of the flow passages 21 is prepared as a flow passage through which the hydraulic fluid 2 flows in a clockwise direction as viewed from the axial upper side (the oil hole 3A side) toward the axial lower side of the inner cylinder 3. Due to this configuration, the shock absorber 1 can increase the length of the flow passage from the oil hole 3A to the oil passage 17A of the holding member compared to the axially linearly extending flow passage.

Each of the partition walls 20 is provided so as to be fixedly attached to the outer peripheral side of the inner cylinder 3. The partition walls 20 are made from an insulating material. More specifically, the partition walls 20 are made from a polymer material elastic, such as elastomer, and electrically insulative. Examples thereof include synthetic rubber. The partition walls 20 are, for example, fixedly attached (adhered) to the inner cylinder 3 with use of an adhesive. The oil holes 3A of the inner cylinder 3 are provided at positions above the respective partition walls 20 and axially opposite from (facing) upper end portions of the respective partition walls 20. In other words, the oil holes 3A of the inner cylinder 3 and the upper end portions of the partition walls 20 (=upper end portions of the sharply inclined portions 20A, which will be described below) are disposed so as to axially coincide with each other. Then, the shock absorber 1 includes the same numbers (4) of oil holes 3A and partition walls 20 as each other.

Now, an inclination angle of each of the partition walls 20 is not constant. That is, the sharply inclined portion 20A inclined at a large angle is provided at least on an entrance side of the extension-side flow passage 21 of the piston rod 9. More specifically, the sharply inclined portion 20A inclined at a large angle compared to the other portion (the mildly inclined portion 20B) is provided on one end side of each of the partition walls 20 (i.e., the entrance side through which the hydraulic fluid 2 flows in at least when the piston rod 9 moves to the extension side).

Since the shock absorber 1 has the uniflow structure in the first embodiment, the one end side of each of the partition walls 20 corresponds to both extension-side and compression-side entrance sides of the piston rod 9. This means that, in the first embodiment, the sharply inclined portion 20A is provided on the entrance sides of both the extension-side and compression-side flow passages 21 of the piston rod 9.

More specifically, as illustrated in FIGS. 2 and 3, the partition walls 20 each include the mildly inclined portion 20B and the sharply inclined portion 20A. The mildly inclined portion 20B is inclined at a relatively mild angle. The sharply inclined portion 20A is provided on an upstream side of this mildly inclined portion 20B in the direction in which the hydraulic fluid 2 flows, and is inclined at a larger angle than the mildly inclined portion 20B. In this case, the sharply inclined portion 20A and the mildly inclined portion 20B are provided obliquely with respect to a direction of an axis K-K of the electrode cylinder 18. Further, the mildly inclined portion 20B corresponds to, for example, a half to most (for example, 50% to 95%) of the partition wall 20, and the sharply inclined portion 20A corresponds to, for example, a half to a part of the partition wall 20 (for example, 50% to 5%). The ratio between the mildly inclined portion 20B and the sharply inclined portion 20A, the inclination angle of the mildly inclined portion 20B (a defined angle $\beta$, which will be described below), and the inclination angle of the sharply inclined portion 20A (a defined angle $\alpha$, which will be described below) can be set from, for example, an experiment, a calculation, or a simulation according to the specifications, the dimensions, and the like of the shock absorber 1 so as to be able to acquire a desired performance (a damping performance and a response performance).

Each of the sharply inclined portions 20A forms the sharply inclined flow passage 21A, which is inclined at a large angle compared to the other portion (the mildly inclined flow passage 21B), in the flow passage 21 between the sharply inclined portions 20A adjacent to each other. The sharply inclined portion 20A constitutes a portion extending obliquely with respect to the direction of the axis K-K of the electrode cylinder 18 as a whole (the entire sharply inclined portion 20A extends obliquely at a constant angle). Each of the mildly inclined portions 20B is located on an opposite end side of each of the partition walls 20 with respect to each of the sharply inclined portions 20A (on a downstream side in the direction in which the hydraulic fluid 2 flows), and is connected to the opposite end side of each of the sharply inclined portions 20A via a bent portion 20C. Each of the mildly inclined portions 20B forms the mildly inclined flow passage 21B, which is inclined at a small angle compared to the sharply inclined flow passage 21A, in the flow passage 21 between the mildly inclined portions 20B adjacent to each other. The bent portion 20C can be prepared as, for example, a curved connection portion to allow the sharply inclined portion 20A and the mildly inclined portion 20B to be smoothly continuous (connected) with each other, thereby further preventing or reducing the disturbance of the damping force characteristic.

In this case, as illustrated in FIG. 3, the defined angle $\alpha$ is larger than the defined angle $\beta$, assuming that L-L represents an imaginary line in parallel with the axis K-K of the electrode cylinder 18, M-M represents an imaginary line perpendicular to this imaginary line L-L (a perpendicular line), $\alpha$ represents an angle defined between the sharply inclined portion 20A and the imaginary line M-M, and $\beta$ represents an angle defined between the mildly inclined portion 20B and the imaginary line M-M. In other words, the defined angle $\alpha$ and the defined angle $\beta$ are in a relationship indicated by the following equation 1.

$$\alpha > \beta \quad \text{[EQUATION 1]}$$

The shock absorber 1 according to the first embodiment is configured in the above-described manner, and an operation thereof will be described next.

When the shock absorber 1 is mounted on the vehicle such as the automobile, for example, the upper end side of the piston rod 9 is attached to the vehicle body side of the vehicle, and the lower end side (the bottom cap 5 side) of the outer cylinder 4 is attached to the wheel side (the axle side). When the vehicle is running, upon occurrence of a vertical vibration due to unevenness of a road surface or the like, the piston rod 9 is displaced so as to be extended and compressed from and into the outer cylinder 4. At this time, the generated damping force of the shock absorber 1 is variably adjusted by generating the potential difference in the electrode passage 19 based on the instruction from the controller and controlling the hydraulic fluid 2 passing through each of the flow passages 21 in the electrode passage 19, i.e., the viscosity of the electrorheological fluid.

For example, at the time of the extension stroke of the piston rod 9, the compression-side check valve 7 of the piston 6 is closed due to the movement of the piston 6 in the inner cylinder 3. Before the disk valve 8 of the piston 6 is opened, the oil fluid (the hydraulic fluid 2) in the rod-side oil chamber B is pressurized, thereby flowing into the electrode passage 19 via the oil holes 3A of the inner cylinder 3. At this time, the oil fluid flows from the reservoir chamber A into the bottom-side oil chamber C by opening the extension-side check valve 15 of the bottom valve 13 by an amount corresponding to the movement of the piston 6.

On the other hand, at the time of the compression stroke of the piston rod 9, the compression-side check valve 7 of the piston 6 is opened and the extension-side check valve 15 of the bottom valve 13 is closed due to the movement of the piston 6 in the inner cylinder 3. Before the bottom valve 13 (the disk valve 16) is opened, the oil fluid in the bottom-side oil chamber C flows into the rod-side oil chamber B. Along therewith, the oil fluid flows from the rod-side oil chamber B into the electrode passage 19 via the oil holes 3A of the inner cylinder 3 by an amount corresponding to the entry of the piston rod 9 into the inner cylinder 3.

In either case (both at the time of the extension stroke and at the time of the compression stroke), the oil fluid introduced in the electrode passage 19 passes through inside the electrode passage 19 toward the exit side (downward) with the viscosity according to the potential difference in the electrode passage 19 (the potential difference between the electrode cylinder 18 and the inner cylinder 3), and flows from the electrode passage 19 into the reservoir chamber A via the oil passages 17A of the holding member 17. At this time, the shock absorber 1 can generate the damping force according to the viscosity of the hydraulic fluid 2 passing through each of the flow passages 21 in the electrode passage 19, thereby absorbing (damping) the vertical vibration of the vehicle.

Now, in the first embodiment, the flow passages 21 are the helical passages formed by the plurality of helically extending partition walls 20. Further, the inclination angle of each of the partition walls 20 is not constant and the sharply inclined portion 20A inclined at the large angle is provided on the entrance side of the extension-side flow passage 21 of the piston rod 9. Therefore, both at the time of the extension stroke and at the time of the compression stroke, the hydraulic fluid 2 flows from the sharply inclined portion 20A on the entrance side of the partition wall 20 along the mildly inclined portion 20B on the intermediate portion and the exit side. As a result, the shock absorber 1 can prevent or reduce the disturbance, i.e., the variation in the damping force characteristic of the shock absorber 1, thereby generating a stable damping force.

More specifically, at the time of the extension stroke and at the time of the compression stroke of the piston rod 9, the flow of the hydraulic fluid 2 introduced from the oil hole 3A of the inner cylinder 3 into the flow passage 21 is adjusted by the sharply inclined portions 20A on the entrance side of the flow passage 21. Therefore, the shock absorber 2 can prevent or reduce the disturbance of the damping force characteristic even with each of the partition walls 20 inclined at the mild angle to secure the length of the flow passage 21 (i.e., even when the flow passage 21 is elongated by inclining the mildly inclined portion 20B on the exit side at a milder angle than the sharply inclined portion 20A). More specifically, even when the extension stroke and the compression stroke of the shock absorber 1 are switched, the shock absorber 1 can adjust the flow of the hydraulic fluid 2 flowing through in the flow passage 21 on the entrance side of the flow passage 21 due to the sharply inclined portion 20A, thereby preventing or reducing the occurrence of the disturbance of the damping force. As a result, the shock absorber 1 can stabilize the waveform of the damping force, thereby eliminating or reducing the variation in the damping force characteristic. In other words, the shock absorber 1 can achieve both the securement of the damping force variable range and the stabilization of the waveform of the damping force.

Conversely, the sharply inclined portion 20A is provided only on the entrance side of the flow passage 21, and the mildly inclined portion 20B is provided on the opposite end side with respect to the sharply inclined portion 20A. Due to this configuration, most of the partition wall 20 can be formed with use of the mildly inclined portion 20B inclined at the small angle compared to the sharply inclined portion 20A. Therefore, the shock absorber 1 can increase the length of the flow passage of the flow passage 21 due to the mildly inclined portion 20B, and also adjust the flow of the hydraulic fluid 2 on the entrance side of the flow passage 21 due to the sharply inclined portion 20A. As a result, the shock absorber 1 can achieve both the increase in the variable range of the damping force generated by the shock absorber 1 and the stabilization of the generated damping force. Further, an effective cross-sectional area of the flow passage 21 between the sharply inclined portions 20A serving as the entrance (the sharply inclined flow passage 21A) is larger than an effective cross-sectional area of the flow passage 21 between the mildly inclined portions 203 located at the intermediate portion (the mildly inclined flow passage 21B). In other words, according to the first embodiment, the flow passage 21 is provided in such a manner that the effective cross-sectional area of the sharply inclined flow passage 21A serving as the entrance of the flow passage 21 is large compared to the effective cross-sectional area of the mildly inclined flow passage 21B located at the intermediate portion of the flow passage 21.

Figure 4:
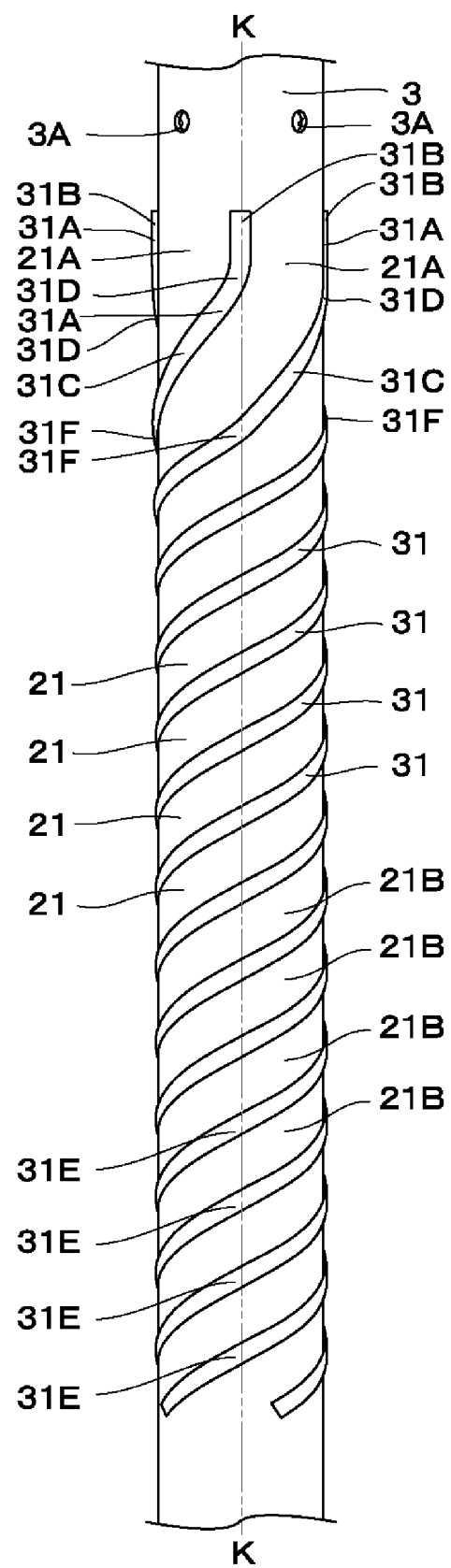
FIG. 4 is a front view illustrating an inner cylinder and a seal unit according to a second embodiment.
Figure 5:
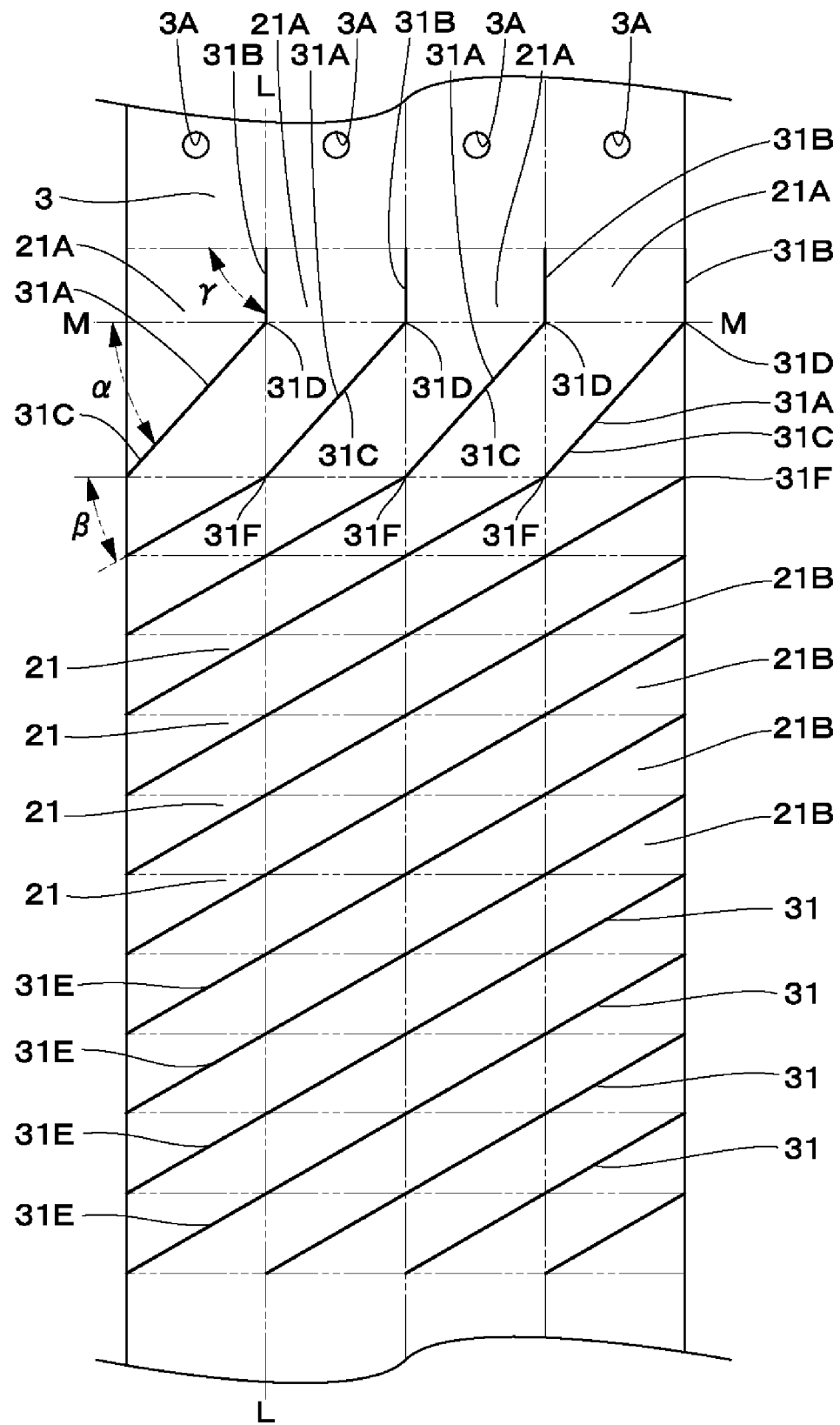
FIG. 5 illustrates the inner cylinder and the seal unit according to the second embodiment in the developed manner.

Next, FIGS. 4 and 5 illustrate a second embodiment. The second embodiment is characterized by being configured in such a manner that the sharply inclined portion of the partition wall is divided into a plurality of portions by a bent portion. The second embodiment will be described, indicating similar components to the first embodiment by the same reference numerals and omitting descriptions thereof.

Partition walls 31 as the flow passage formation units (the seal units) are used in the second embodiment instead of the partition walls 20 in the first embodiment. Each of the partition walls 31 includes a sharply inclined portion 31A and a mildly inclined portion 31E, and extends circumferentially obliquely between the inner cylinder 3 and the electrode cylinder 18. The partition walls 31 form the plurality of (four) flow passages 21 between the inner cylinder 3 and the electrode cylinder 18, i.e., in the electrode passage 19. In other words, each of the partition walls 31 functions to divide the flow of the hydraulic fluid 2 into the plurality of flow passages 21 (guide the flow of the hydraulic fluid 2) between the inner peripheral side of the electrode cylinder 18 and the outer peripheral side of the inner cylinder 3. Each of the oil holes 3A of the inner cylinder 3 is provided at a position on an upper side with respect to each of the partition walls 31 and between upper end portions of the partition walls 31 adjacent to each other. In other words, the oil hole 3A of the inner cylinder 3 and the upper end portion of the partition wall 31 (=an upper end portion of the sharply inclined portion 31A, which will be described below) are arranged out of alignment with each other in the circumferential direction of the inner cylinder 3.

Now, an inclination angle of each of the partition walls 31 is not constant. That is, the sharply inclined portion 31A inclined at a large angle is provided at least on the entrance side of the extension-side and compression-side flow passage 21 of the piston rod 9. More specifically, the sharply inclined portion 31A inclined at a large angle compared to the other portion (the mildly inclined portion 31E) is provided on one end side of each of the partition walls 31 (i.e., the entrance side through which the hydraulic fluid 2 flows in when the piston rod 9 moves to the extension side and the compression side).

Further more specifically, the partition wall 31 includes the sharply inclined portion 31A and the mildly inclined portion 31E in this order starting from the upstream side in the direction in which the hydraulic fluid 2 flows. In this case, the mildly inclined portion 31E corresponds to, for example, a half to most (for example, 50% to 95%) of the partition wall 31, and the sharply inclined portion 31A corresponds to, for example, a half to a part of the partition wall 31 (for example, 50% to 5%). Each of the sharply inclined portions 31A forms the sharply inclined flow passage 21A, which is inclined at a large angle compared to the other portion (the mildly inclined flow passage 21B), in the flow passage 21 between the sharply inclined portions 31A adjacent to each other.

In this case, the sharply inclined portion 31A includes a first inclined portion 31B and a second inclined portion 31C. The first inclined portion 31B is located on one end side of the sharply inclined portion 31A. The second inclined portion 31C is located on an opposite end side of the sharply inclined portion 31A. More specifically, the sharply inclined portion 31A of the partition wall 31 includes a first bent portion 31D as a bent portion at an intermediate portion thereof, and the sharply inclined portion 31A is divided into a plurality of portions, the first inclined portion 31B and the second inclined portion 31C with a boundary therebetween lying at the first bent portion 31D. The first bent portion 31D can be prepared as, for example, a curved connection portion to allow the first inclined portion 31B and the second inclined portion 31C to be smoothly continuous (connected) with each other.

The first inclined portion 31B is located on the one end side of the partition wall 31, and is provided in parallel with the direction of the axis K-K of the electrode cylinder 18. On the other hand, the second inclined portion 31C is located between the first inclined portion 31B and the mildly inclined portion 31E of the partition wall 31, and is provided obliquely with respect to the direction of the axis K-K of the electrode cylinder 18. The first inclined portion 31B and the second inclined portion 31C are connected via the first bent portion 31D therebetween. Due to this configuration, the sharply inclined portion 31A includes a portion extending obliquely with respect to the direction of the axis K-K of the electrode cylinder 18 (the second inclined portion 31C), and a portion extending in parallel with the direction of the axis K-K of the electrode cylinder 18 (the first inclined portion 31B).

On the other hand, each of the mildly inclined portions 31E of each of the partition walls 31 is located on the opposite end side of each of the partition walls 31 with respect to each of the sharply inclined portions 31A, and is connected to the opposite end side of each of the sharply inclined portions 31A (the opposite end side of the second inclined portion 31C) via a second bent portion 31F. The second bent portion 31F as the bent portion can be prepared as, for example, a curved connection portion to allow the sharply inclined portion 31A and the mildly inclined portion 31E to be smoothly continuous (connected) with each other. Each of the mildly inclined portions 31E forms the mildly inclined flow passage 21B, which is inclined at a small angle compared to the sharply inclined flow passage 21A, in the flow passage 21 between the mildly inclined portions 31E adjacent to each other.

In this case, as illustrated in FIG. 5, a defined angle γ is larger than the defined angle α and the defined angle α is larger than the defined angle β, assuming that L-L represents the imaginary line in parallel with the axis K-K of the electrode cylinder 18, M-M represents the imaginary line perpendicular to this imaginary line L-L (the perpendicular line), γ represents an angle defined between the first inclined portion 31B of the sharply inclined portion 31A and the imaginary line M-M, α represents an angle defined between the second inclined portion 31C of the sharply inclined portion 31A and the imaginary line M-M, and β represents an angle defined between the mildly inclined portion 31E and the imaginary line M-M. In other words, the defined angle γ, the defined angle α, and the defined angle β are in a relationship indicated by the following equation 2. Further, the defined angle γ is 90 degrees (γ=90 degrees).

$$\gamma > \alpha > \beta \quad [\text{EQUATION 2}]$$

The second embodiment is configured to partition the flow passages 21 by the partition walls 31 as described above, and a basic operation thereof is not especially different from the operation performed by the first embodiment.

Especially, according to the second embodiment, the shock absorber 1 is configured in such a manner that the sharply inclined portion 31A on the entrance side of the partition wall 31 is divided by the first bent portion 31D into the plurality of portions, the first inclined portion 31B on the entrance side and the second inclined portion 31C on the intermediate portion and the exit side. In this case, the first inclined portion 31B is provided in parallel with the direction of the axis K-K of the electrode cylinder 18. Further, the second inclined portion 31C is provided obliquely with respect to the direction of the axis K-K of the electrode cylinder 18.

Due to this configuration, both at the time of the extension stroke and at the time of the compression stroke, the hydraulic fluid 2 flows from the sharply inclined portion 31A of the partition wall 31 along the mildly inclined portion 31E. In this case, the shock absorber 1 allows the inclination angle of the first inclined portion 31B and the inclination angle of the second inclined portion 31C to be set individually independently, thereby allowing the hydraulic fluid 2 to flow along the sharply inclined portion 31A according to a further fine flow setting (adjustment). As a result, the shock absorber 1 allows the damping force characteristic thereof to be further finely set. Further, the effective cross-sectional area of the flow passage 21 (the sharply inclined flow passage 21A) between the sharply inclined portions 31A serving as the entrance is larger than the effective cross-sectional area of the flow passage 21 (the mildly inclined flow passage 21B) between the mildly inclined portions 31E located at the intermediate portion.

Figure 6:
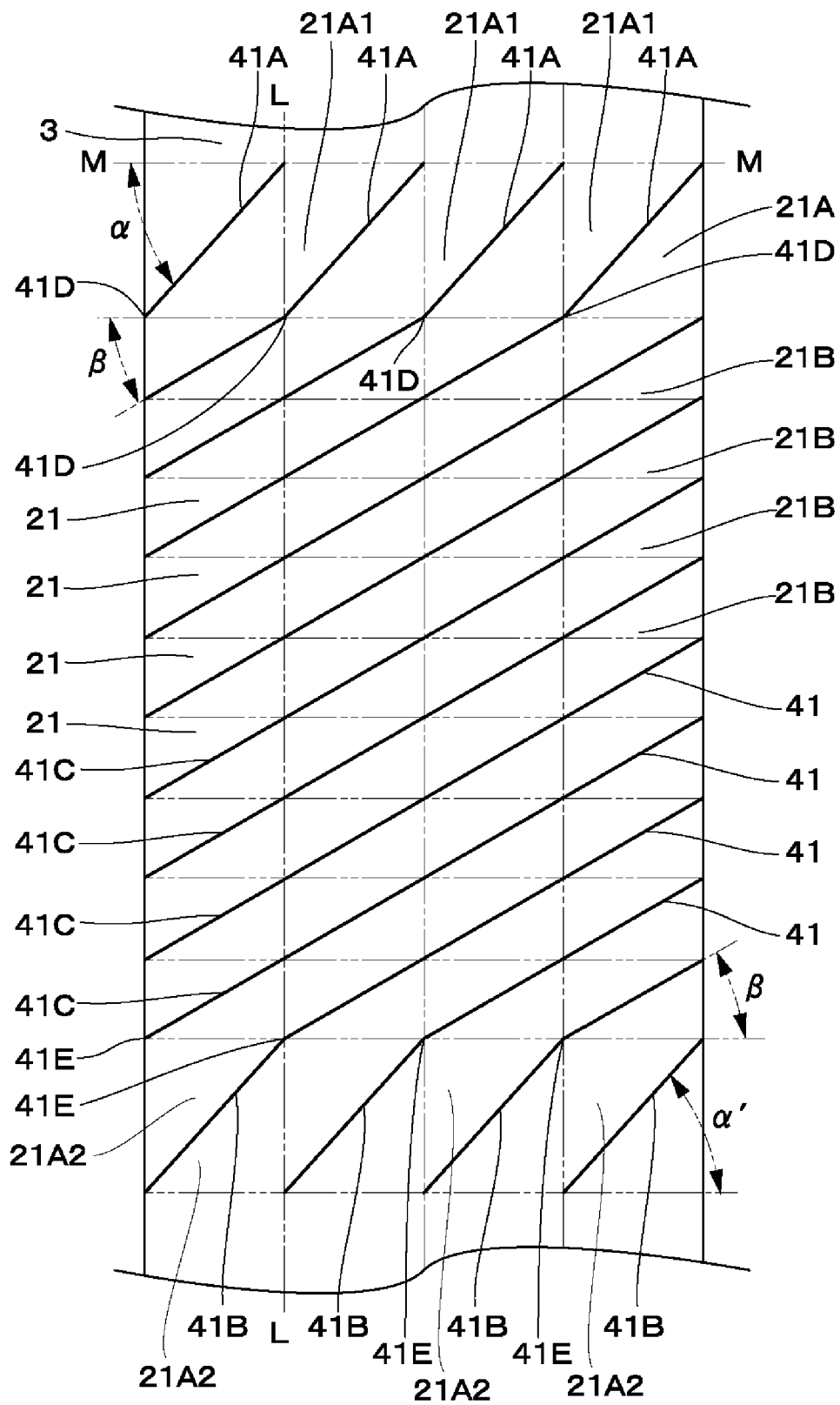
FIG. 6 illustrates an inner cylinder and a seal unit according to a third embodiment in the developed manner.

Next, FIG. 6 illustrates a third embodiment. The third embodiment is characterized by being configured in such a manner that the sharply inclined portion is provided on both the entrance side of the extension-side flow passage and the entrance side of the compression-side flow passage (the exit side of the extension-side flow passage). The third embodiment will be described, indicating similar components to the first embodiment by the same reference numerals and omitting descriptions thereof. Now, the shock absorber 1 according to the third embodiment has a bi-flow structure. Therefore, the hydraulic fluid 2 flows in opposite directions during the extension stroke and the compression stroke of the piston rod 9.

Partition walls 41 as the flow passage formation units (the seal units) are used in the third embodiment instead of the partition walls 20 in the first embodiment. The plurality of (four) partition walls 41 is provided between the inner cylinder 3 and the electrode cylinder 18. Each of the partition walls 41 includes a one-end-side sharply inclined portion 41A and an opposite-end-side sharply inclined portion 41B, and a mildly inclined portion 41C at an intermediate portion, and extends circumferentially obliquely between the inner cylinder 3 and the electrode cylinder 18. The partition walls 41 form the plurality of (four) flow passages 21 between the inner cylinder 3 and the electrode cylinder 18, i.e., in the electrode passage 19. In other words, each of the partition walls 41 functions to divide the flow of the hydraulic fluid 2 into the plurality of flow passages 21 (guide the flow of the hydraulic fluid 2) between the inner peripheral side of the electrode cylinder 18 and the outer peripheral side of the inner cylinder 3. In this case, a portion between the one-end-side sharply inclined portions 41A of the respective partition walls 41 serves as a one-end-side sharply inclined flow passage 21A1, a portion between the respective mildly inclined portions 41C serves as a mildly inclined flow passage 21B, and a portion between the respective opposite-end-side sharply inclined portions 41B serves as an opposite-end-side sharply inclined flow passage 21A2. In other words, the flow passage 21 formed by each of the partition walls 41 includes the one-end-side sharply inclined flow passage 21A1 between the respective one-end-side sharply inclined portions 41A, the mildly inclined flow passage 21B between the respective mildly inclined portions 41C, and the opposite-end-side sharply inclined flow passage 21A2 between the respective opposite-end-side sharply inclined portions 41B.

Now, an inclination angle of each of the partition walls 41 is not constant, and the one-end-side sharply inclined portion 41A inclined at a large angle is provided on the entrance side of the extension-side flow passage 21 of the piston rod 9 and the opposite-end-side sharply inclined portion 41B inclined at a large angle is provided on the entrance side of the compression-side flow passage 21 of the piston rod 9. In other words, the one-end-side sharply inclined portion 41A as the sharply inclined portion and the opposite-end-side sharply inclined portion 41B as the sharply inclined portion are provided on each of both the entrance side of the extension-side flow passage 21 and the entrance side of the compression-side flow passage 21.

More specifically, the one-end-side inclined portion 41A inclined at a large angle compared to the other portion (the mildly inclined portion 41C) is provided on the one end side of each of the partition walls 41 (i.e., the entrance side through which the hydraulic fluid 2 flows in when the piston rod 9 moves to the extension side). In other words, the one-end-side sharply inclined portion 41A is provided obliquely with respect to the direction of the axis K-K of the electrode cylinder 18 as illustrated in FIG. 6. In this case, the one-end-side sharply inclined portion 41A constitutes the portion extending obliquely with respect to the direction of the axis K-K of the electrode cylinder 18 as a whole (the entire one-end-side sharply inclined portion 41A extends obliquely at a constant angle).

On the other hand, the opposite-end-side sharply inclined portion 41B inclined at a large angle compared to the other portion (the mildly inclined portion 41C) is provided on the opposite end side of each of the partition walls 41 (i.e., the entrance side through which the hydraulic fluid 2 flows in at least when the piston rod 9 moves to the compression side). In other words, the opposite-end-side sharply inclined portion 41B is provided obliquely with respect to the direction of the axis K-K of the electrode cylinder 18 as illustrated in FIG. 6. In this case, the opposite-end-side sharply inclined portion 41B constitutes the portion extending obliquely with respect to the direction of the axis K-K of the electrode cylinder 18 as a whole (the entire opposite-end-side sharply inclined portion 41B extends obliquely at a constant angle).

Further more specifically, the partition wall 41 includes the one-end-side sharply inclined portion 41A, the mildly inclined portion 41C, and the opposite-end-side sharply inclined portion 41B in this order starting from the one end side in the direction in which the hydraulic fluid 2 flows. In this case, the mildly inclined portion 41C corresponds to, for example, a half to most (for example, 50% to 95%) of the partition wall 41, the one-end-side sharply inclined portion 41A corresponds to, for example, a quarter to a part of the partition wall 41 (for example, 25% to 2.5%), and the opposite-end-side sharply inclined portion 41B corresponds to, for example, a quarter to a part of the partition wall 41 (for example, 25% to 2.5%).

On the other hand, each of the mildly inclined portions 41C of the individual partition walls 41 is provided at a position between each of the one-end-side sharply inclined portions 41A and each of the opposite-end-side sharply inclined portions 41B. One end side of each of the mildly inclined portions 41C is connected to an opposite end side of each of the one-end-side sharply inclined portions 41A via a one-end-side bent portion 41D. The one-end-side bent portion 41D as the bent portion can be prepared as, for example, a curved connection portion to allow the one-end-side sharply inclined portion 41A and the mildly inclined portion 41C to be smoothly continuous (connected) with each other.

Further, an opposite end side of each of the mildly inclined portions 41C is connected to one end side of each of the opposite-end-side sharply inclined portions 41B via an opposite-end-side bent portion 41E. The opposite-end-side bent portion 41E as the bent portion can be prepared as, for example, a curved connection portion to allow the opposite-end-side sharply inclined portion 41B and the mildly inclined portion 41C to be smoothly continuous (connected) with each other. Each of the mildly inclined portions 41C forms the mildly inclined flow passage 21B, which is inclined at a small angle compared to the sharply inclined flow passage 21A, in the flow passage 21 between the mildly inclined portions 41C adjacent to each other.

In this case, as illustrated in FIG. 6, the defined angle α is larger than the defined angle β, assuming that L-L represents the imaginary line in parallel with the axis K-K of the electrode cylinder 18, M-M represents the imaginary line perpendicular to this imaginary line L-L (the perpendicular line), α represents an angle defined between the one-end-side sharply inclined portion 41A and the imaginary line M-M, and β represents an angle defined between the mildly inclined portion 41C and the imaginary line M-M. In other words, the defined angle α and the defined angle β are in a relationship indicated by the following equation 3.

$$\alpha > \beta \quad \text{[EQUATION 3]}$$

Further, a defined angle α' is larger than the defined angle β, assuming that α' represents an angle defined between the opposite-end-side sharply inclined portion 41B and the imaginary line M-N. In other words, the defined angle α' and the defined angle β are in a relationship indicated by the following equation 4. In this case, the defined angle α and the defined angle α' are set to the same angle as each other.

$$\alpha' > \beta \quad \text{[EQUATION 4]}$$

The third embodiment is configured to partition the flow passages 21 by the partition walls 41 as described above, and a basic operation thereof is not especially different from the operation performed by the first embodiment. Especially, according to the third embodiment, the shock absorber 1 is configured in such a manner that the one-end-side sharply inclined portion 41A is provided on the entrance side of the extension-side flow passage 21 and the opposite-end-side sharply inclined portion 41B is provided on the entrance side of the compression-side flow passage 21, so that the sharply inclined portion is provided on both the entrance sides of the extension-side and compression-side flow passages 21. Due to this configuration, the shock absorber 1 can prevent or reduce the disturbance (the variation) of the damping force characteristic during both the compression stoke and the extension stroke of the piston rod 9 even when being configured as the bi-flow structure.

More specifically, during the extension stroke of the piston rod 9, for example, the hydraulic fluid 2 flows from the one end side toward the opposite end side. At this time, the flow of the hydraulic fluid 2 introduced into the flow passage 21 is adjusted by the one-end-side sharply inclined portion 41A. On the other hand, during the compression stroke of the piston rod 9, for example, the hydraulic fluid 2 flows from the opposite end side toward the one end side. At this time, the flow of the hydraulic fluid 2 introduced into the flow passage 21 is adjusted by the opposite-end-side sharply inclined portion 41B. Due to this configuration, the shock absorber 1 can prevent or reduce the occurrence of the disturbance of the damping force characteristic during both the compression stoke and the extension stroke of the piston rod 9, thereby stabilizing the waveform of the damping force.

In the third embodiment configured in this manner, the flow passage 21 has a large effective cross-sectional area at the exit at the time of the extension stroke (i.e., a flow passage cross-sectional area of the opposite-end-side sharply inclined flow passage 21A2 between the oppositeend-side sharply inclined portions 41B) compared to an effective cross-sectional area of the flow passage 21 of the mildly inclined portion 41C for increasing the length of the flow passage 21 (the flow passage length) (i.e., a flow passage cross-sectional area of the mildly inclined flow passage 21B between the mildly inclined portions 41C). Further, the flow passage 21 has a large cross-sectional area at the exit at the time of the compression stroke (i.e., a flow passage cross-sectional area of the one-end-side sharply inclined flow passage 21A1 between the one-end-side sharply inclined portions 41A) compared to the cross-sectional area of the flow passage 21 of the mildly inclined portion 41C for increasing the length of the flow passage 21 (the flow passage length) (i.e., the flow passage cross-sectional area of the mildly inclined flow passage 21B between the mildly inclined portions 41C). Due to this configuration, the opposite-end-side sharply inclined portion 41B forms a flow passage cross-sectional area change unit at which the cross-sectional area of the flow passage 21 on the exit side increases at the time of the extension stroke. Further, the one-end-side sharply inclined portion 41A forms a flow passage cross-sectional area change unit at which the cross-sectional area of the flow passage 21 on the exit side increases at the time of the compression stroke. In this case, the opposite-end-side sharply inclined portion 41B forms the flow passage cross-sectional area change unit at which the cross-sectional area of the flow passage 21 on the exit side increases by being inclined at a sharper angle than the mildly inclined portion 41C, i.e., defining the larger angle α' than the angle β defined by the mildly inclined portion 41C. Further, the one-end-side sharply inclined portion 41A also forms the flow passage cross-sectional area change unit at which the cross-sectional area of the flow passage 21 on the exit side increases by being inclined at a sharper angle than the mildly inclined portion 41C, i.e., defining the larger angle α than the angle β defined by the mildly inclined portion 41C. Therefore, the shock absorber 1 can also prevent or reduce the disturbance of the damping force characteristic in this regard. Now, the effective cross-sectional area means a cross-sectional area when the flow passage 21 and the flow passage 21 are connected to each other via a surface extending straight therebetween. In other words, the cross-sectional taken along a line segment extending straight between the sharply inclined portion 41B and the sharply inclined portion 41B adjacent to each other is large compared to a cross-sectional area taken along a line segment extending straight between the mildly inclined portion 41C and the mildly inclined portion 41C adjacent to each other. The effective cross-sectional area is not an area in cross section in the circumferential direction of the inner cylinder 3 and the outer cylinder 4. In sum, according to the third embodiment, the flow passage 21 is provided in such a manner that the effective cross-sectional area of each of the sharply inclined flow passages 21A1 and 21A2 serving as the entrance and the exit of the flow passage 21 is large compared to the effective cross-sectional area of the mildly inclined flow passage 21B located at the intermediate portion of the flow passage 21.

Figure 7:
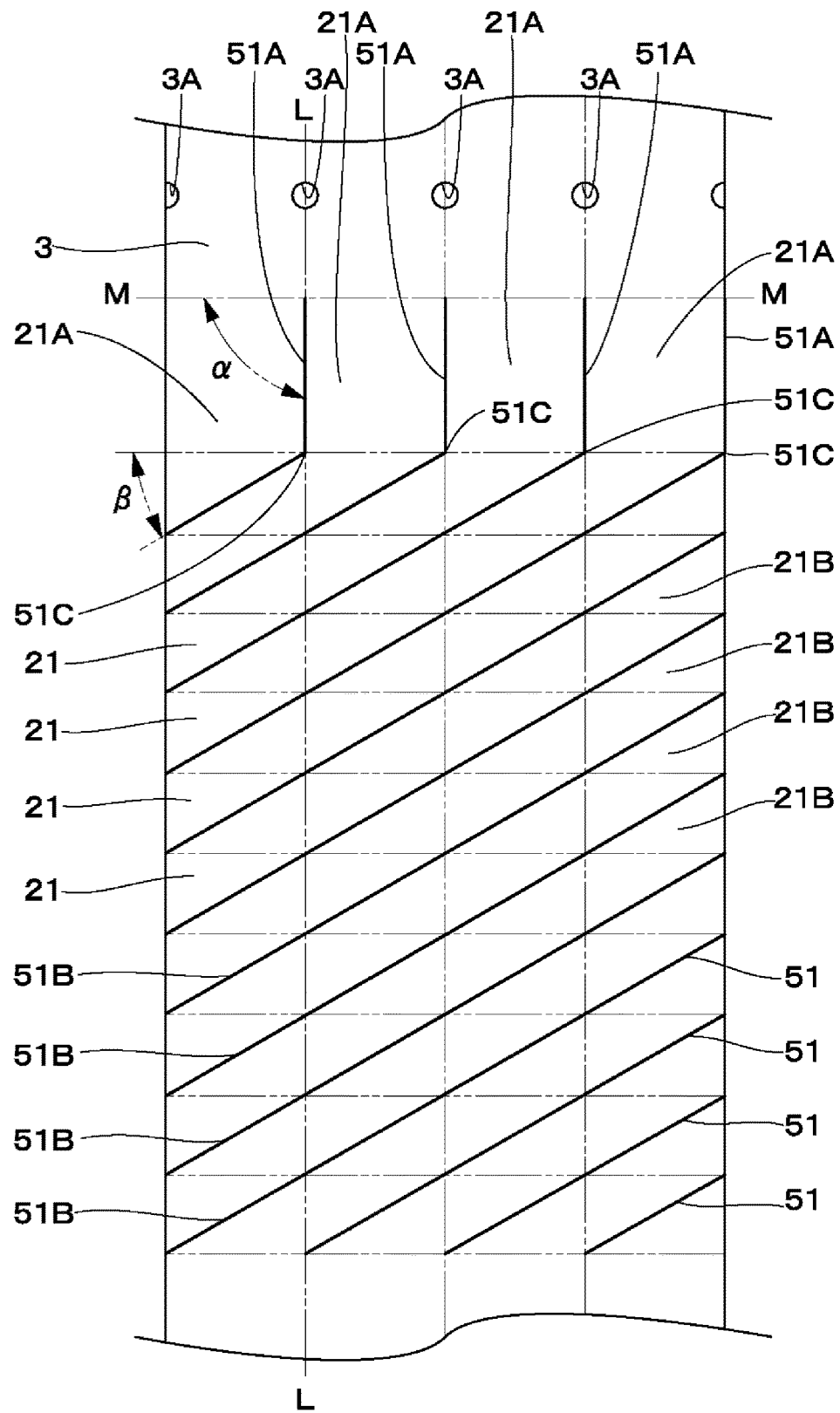
FIG. 7 illustrates an inner cylinder and a seal unit according to a fourth embodiment in the developed manner.

Next, FIG. 7 illustrates a fourth embodiment. The fourth embodiment is characterized by being configured in such a manner that the sharply inclined portion is provided in parallel with the axial direction of the electrode cylinder. The fourth embodiment will be described, indicating similar components to the first embodiment by the same reference numerals and omitting descriptions thereof.

Partition walls 51 as the flow passage formation units (the seal units) are used in the fourth embodiment instead of the partition walls 20 in the first embodiment. An inclination angle of each of the partition walls 51 is also not constant in the fourth embodiment similarly to the first embodiment. That is, a sharply inclined portion 51A, which is inclined at a large angle on an entrance side, is provided on the entrance side of the flow passage 21. Then, the sharply inclined portion 51A constitutes the portion extending in parallel with the direction of the axis K-K of the electrode cylinder 18 as a whole (the entire sharply inclined portion 51A extends in parallel at a constant angle). Each of mildly inclined portions 51B on the intermediate portion and the exit side is located on an opposite end side of each of the partition walls 51 with respect to each of the sharply inclined portions 51A (on the downstream side in the direction in which the hydraulic fluid 2 flows), and is connected to an opposite end side of each of the sharply inclined portions 51A via a bent portion 51C.

In this case, as illustrated in FIG. 7, the defined angle α is larger than the defined angle β (α>β), assuming that α represents an angle defined between the sharply inclined portion 51A and the imaginary line M-M and β represents an angle defined between the mildly inclined portion 51B and the imaginary line M-M. Then, α is set to 90 degrees (α=90 degrees).

The fourth embodiment is configured to partition the flow passages 21 by the partition walls 51 as described above, and a basic operation thereof is not especially different from the operation performed by the first embodiment. In sum, in the case of the fourth embodiment, the shock absorber 1 can also prevent or reduce the disturbance (the variation) of the damping force characteristic.

Figure 8:
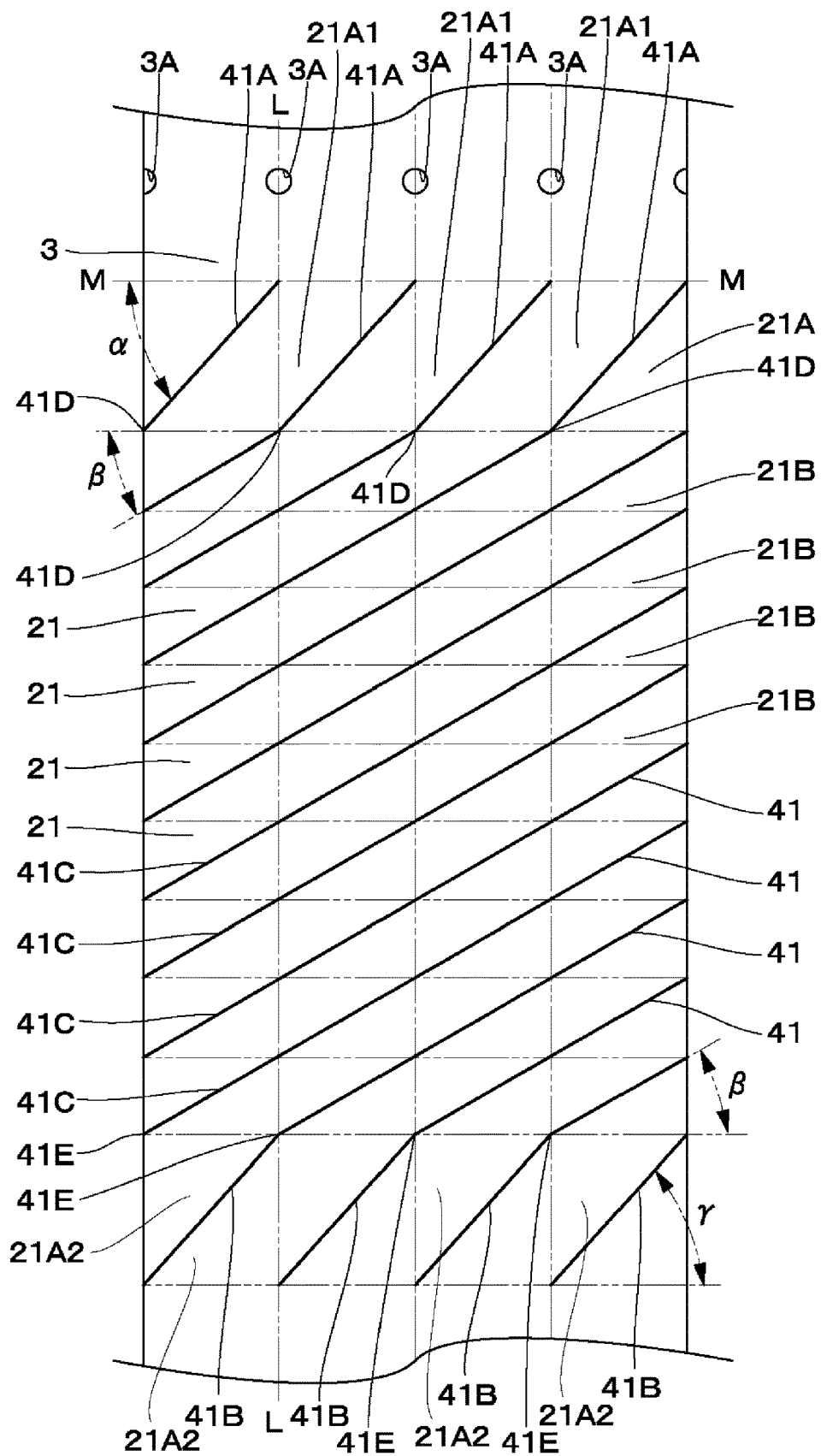
FIG. 8 illustrates an inner cylinder and a seal unit according to a fifth embodiment in the developed manner.

Next, FIG. 8 illustrates a fifth embodiment. The fifth embodiment is characterized by being configured to include the flow passage cross-sectional area change unit at which the cross-sectional area of the flow passage on the exit is large compared to the cross-sectional area of the flow passage of the mildly inclined portion for increasing the flow passage length similarly to the above-described third embodiment. The fifth embodiment will be described, indicating similar components to the first embodiment and the third embodiment by the same reference numerals and omitting descriptions thereof. Now, the flow passage cross-sectional area means the cross-sectional area (the effective cross-sectional area) when the flow passage 21 and the flow passage 21 are connected to each other via the surface extending straight therebetween.

In the above-described third embodiment, the shock absorber 1 has the bi-flow structure in which the hydraulic fluid 2 flows in opposite directions during the extension stroke and the compression stroke of the piston rod 9. On the other hand, the fifth embodiment has the uniflow structure while being configured to include the partition walls 41 same as the third embodiment. More specifically, in the fifth embodiment, the hydraulic fluid 2 in the inner cylinder 3 flows from the rod-side oil chamber B (i.e., the oil holes 3A of the inner cylinder 3) toward the electrode passage 19 constantly unidirectionally (i.e., from the upper side to the lower side in FIG. 8) during both the compression stroke and the extension stroke of the piston rod 9.

In the fifth embodiment, the plurality of (four) partition walls 41 is provided between the inner cylinder 3 and the electrode cylinder 18 so as to be inclined at some angle with respect to the axial direction, similarly to the third embodiment. The partition walls 41 form the seal units (the flow passage formation units) that divide the flow of the hydraulic fluid 2 into the plurality of flow passages 21 (separate and space the plurality of flow passages 21 therebetween). In this case, each of the partition walls 41 includes the one-end-side (entrance-side) sharply inclined portion 41A and the opposite-end-side (exit-side) sharply inclined portion 41B, and the mildly inclined portion 41C at the intermediate portion, and extends circumferentially obliquely between the inner cylinder 3 and the electrode cylinder 18. Due to this configuration, the partition walls 41 form the plurality of (four) flow passages 21 between the inner cylinder 3 and the electrode cylinder 18, i.e., in the electrode passage 19. In this case, the portion between the one-end-side sharply inclined portions 41A of the respective partition walls 41 serves as the one-end-side (entrance-side) sharply inclined flow passage 21A1, the portion between the respective mildly inclined portions 41C serves as the mildly inclined flow passage 21B located at the intermediate portion, and the portion between the respective opposite-end-side sharply inclined portions 41B serves as the opposite-end-side (exit-side) sharply inclined flow passage 21A2. In other words, the flow passage 21 formed by each of the partition walls 41 includes the one-end-side sharply inclined flow passage 21A1 between the respective one-end-side sharply inclined portions 41A, the mildly inclined flow passage 21B between the respective mildly inclined portions 41C, and the opposite-end-side sharply inclined flow passage 21A2 between the respective opposite-end-side sharply inclined portions 41B.

Now, the inclination angle of each of the partition walls 41 is not constant, and the one-end-side sharply inclined portion 41A inclined at the large angle is formed on the entrance of the flow passage 21 and the opposite-end-side sharply inclined portion 41B inclined at the large angle is formed on the exit of the flow passage 21. In other words, the one-end-side sharply inclined portion 41A as the sharply inclined portion and the opposite-end-side sharply inclined portion 41B as the sharply inclined portion are provided on each of both the entrance side and the exit side of the flow passage 21. In this case, the entrance side of the flow passage 21 serves as the entrance side (the upstream side) from which the hydraulic fluid 2 flows in from the rod-side oil chamber B during both the extension stroke (the extension side) and the compression side (the compression stroke), and the exit side of the flow passage 21 serves as the exit side (the downstream side) from which the hydraulic fluid 2 flows out into the reservoir chamber A during both the extension stroke (the extension side) and the compression side (the compression stroke).

Then, the one end side of each of the partition walls 41 (i.e., the entrance side) forms the one-end-side sharply inclined portion 41A inclined at the large angle compared to the other portion (the mildly inclined portion 41C). In other words, the one-end-side sharply inclined portion 41A is provided obliquely with respect to the direction of the axis K-K of the electrode cylinder 18 as illustrated in FIG. 8. In this case, the one-end-side sharply inclined portion 41A constitutes the portion extending obliquely with respect to the direction of the axis K-K of the electrode cylinder 18 as a whole (the entire one-end-side sharply inclined portion 41A extends obliquely at the constant angle). Further, the opposite end side of each of the partition walls 41 (i.e., the exit side) forms the opposite-end-side sharply inclined portion 41B inclined at the large angle compared to the other portion (the mildly inclined portion 41C). In other words, the opposite-end-side sharply inclined portion 41B is provided obliquely with respect to the direction of the axis K-K of the electrode cylinder 18 as illustrated in FIG. 8. In this case, the opposite-end-side sharply inclined portion 41B constitutes the portion extending obliquely with respect to the direction of the axis K-K of the electrode cylinder 18 as a whole (the entire opposite-end-side sharply inclined portion 41B extends obliquely at the constant angle).

In this manner, the partition wall 41 also includes the one-end-side sharply inclined portion 41A as an upstream-side sharply inclined portion, the mildly inclined portion 41C for increasing the flow passage length, and the opposite-end-side sharply inclined portion 41B as a downstream-side sharply inclined portion in this order starting from the one end side (i.e., the upstream side) in the direction in which the hydraulic fluid 2 flows in the case of the fifth embodiment similarly, to the third embodiment. Then, each of the mildly inclined portions 41C of the individual partition walls 41 is provided at the position between each of the one-end-side sharply inclined portions 41A and each of the opposite-end-side sharply inclined portions 41B. Each of the mildly inclined portions 41C forms the mildly inclined flow passage 21B, which is inclined at the small angle compared to the sharply inclined flow passage 21A, in the flow passage 21 between the mildly inclined portions 41C adjacent to each other.

In this case, as illustrated in FIG. 8, the defined angle α is larger than the defined angle β and the defined angle γ is larger than the defined angle β, assuming that L-L represents the imaginary line in parallel with the axis K-K of the electrode cylinder 18, M-M represents the imaginary line perpendicular to this imaginary line L-L (the perpendicular line), α represents the angle defined between the one-end-side sharply inclined portion 41A and the imaginary line M-M, β represents the angle defined between the mildly inclined portion 41C and the imaginary line M-M, and γ represents the angle defined between the opposite-end-side sharply inclined portion 41B and the imaginary line M-M. In other words, the defined angle α, the defined angle β, and the defined angle γ are in a relationship indicated by the following equation 5. The defined angle α and the defined angle γ may be set to the same angle as each other, or the defined angle α and the defined angle γ may be set to different angles from each other.

$$\alpha > \beta, \gamma > \beta \qquad \text{[EQUATION 5]}$$

In any case, in the fifth embodiment, the flow passage 21 has the large cross-sectional area at the exit (i.e., the flow passage cross-sectional area of the opposite-end-side sharply inclined flow passage 21A2 between the opposite-end-side sharply inclined portions 41B) compared to the cross-sectional area of the flow passage 21 at the mildly inclined portion 41C for increasing the length of the flow passage 21 (the flow passage length) (i.e., the flow passage cross-sectional area of the mildly inclined flow passage 21B between the mildly inclined portions 41C). Due to this configuration, the opposite-end-side sharply inclined portion 41B forms the flow passage cross-sectional area change unit at which the cross-sectional area of the flow passage 21 on the exit side increases. In this case, the opposite-end-side sharply inclined portion 41B forms the flow passage cross-sectional area change unit at which the cross-sectional area of the flow passage 21 on the exit side increases by being inclined at a sharper angle than the mildly inclined portion 41C, i.e., defining the larger angle γ than the angle β defined by the mildly inclined portion 41C.

The fifth embodiment is configured to partition the flow passages 21 by the partition walls 41 as described above, and a basic operation thereof is not especially different from the operations performed by the first embodiment and the third embodiment. Especially, in the fifth embodiment (and the third embodiment), the flow passage 21 has the large cross-sectional area at the exit, i.e., at the opposite-end-side sharply inclined flow passage 21A2 between the opposite-end-side sharply inclined portions 41B compared to the cross-sectional area of the mildly inclined flow passage 21B between the mildly inclined portions 41C for increasing the flow passage length of the flow passage 21. In other words, the flow passage 21 is provided with the flow passage cross-sectional area change unit (i.e., the opposite-end-side sharply inclined portion 41B) at which the cross-sectional area of the flow passage 21 at the exit (the flow passage cross-sectional area of the opposite-end-side sharply inclined flow passage 21A2) increases compared to the cross-sectional area of the flow passage 21 at the mildly inclined portion 41C for increasing the flow passage length (the flow passage cross-sectional area of the mildly inclined flow passage 21B). In sum, the flow passage 21 is provided in such a manner that the effective cross-sectional area of the opposite-end-side sharply inclined flow passage 21A2 serving as the exit of the flow passage 21 is large compared to the effective cross-sectional area of the mildly inclined flow passage 21B located at the intermediate portion of the flow passage 21. In this case, the effective cross-sectional area is changed by changing the angle of the partition wall 41 (at an intermediate portion thereof). As a result, the shock absorber 1 can prevent or reduce the disturbance (the variation) of the damping force characteristic.

A reason therefor is as follows. That is, the flow passage 21 should be lengthened to secure the damping force variable range. Then, to increase the flow passage length, the partition wall 41 is provided with the mildly inclined portion 41C defining the small angle β, and the portion therebetween is configured as the mildly inclined flow passage 21B inclined at the mild angle in the flow passage 21. However, the flow passage cross-sectional area of the mildly inclined flow passage 21B (i.e., the cross-sectional area in the direction perpendicular to the direction in which the hydraulic fluid 21 flows) is, for example, smaller than the flow passage cross-sectional area of the one-end-side sharply inclined flow passage 21A1 inclined at the large angle by an amount as large as the mildness of the inclination angle. Then, for example, if the shock absorber 1 is configured in such a manner that the hydraulic fluid 2 is directly discharged from the exit of the mildly inclined flow passage 21B having the small flow passage cross-sectional area into the reservoir chamber A, the damping force characteristic may be disturbed. More specifically, the small flow passage cross-sectional area causes the hydraulic fluid 2 to be injected into the reservoir chamber A with a flow speed kept high around the exit having this small flow passage cross-sectional area. This may cause the hydraulic fluid 2 in the reservoir chamber A to be stirred, thereby leading to occurrence of aeration and thus occurrence of the disturbance of the damping force characteristic (deformation of the waveform of the damping force).

On the other hand, in the fifth embodiment (and the above-described third embodiment), the exit of the flow passage 21 has the large flow passage cross-sectional area. That is, the downstream side of the mildly inclined flow passage 21B has the large flow passage cross-sectional area compared to the mildly inclined flow passage 21B. In other words, the opposite-end-side sharply inclined flow passage 21A2, which has the larger flow passage cross-sectional area than this mildly inclined flow passage 21B, is formed on the downstream side of the mildly inclined flow passage 21B. To satisfy this configuration, the partition wall 41 includes the mildly inclined portion 41C for increasing the flow passage length, and the opposite-end-side sharply inclined flow passage 41B located on the downstream side of this mildly inclined portion 41C and defining the larger angle γ than the angle β defined by this mildly inclined portion 41C. This opposite-end-side sharply inclined flow passage 41B is the flow passage cross-sectional area change unit that increases the cross-sectional area of the exit of the flow passage 21, and the provision of this opposite-end-side sharply inclined portion 41B establishes the opposite-end-side sharply inclined flow passage 21A2 having the larger flow passage cross-sectional area than the mildly inclined flow passage 21B on the downstream side of this mildly inclined flow passage 21B.

According to the fifth embodiment configured in this manner (and the above-described third embodiment), the hydraulic fluid 2 in the flow passage 21 is discharged from the electrode passage 19 into the reservoir chamber A via the opposite-end-side sharply inclined flow passage 21A2 having the larger flow passage cross-sectional area than the mildly inclined flow passage 21B. In other words, the hydraulic fluid 2 in the flow passage 21 flows at a lower speed by passing through between the opposite-end-side sharply inclined portions 41B, and is discharged into the reservoir chamber A while flowing at the lower speed in this manner. Therefore, the shock absorber 1 can prevent or reduce the stirring of the hydraulic fluid 2 in the reservoir chamber A, thereby reducing the aeration. As a result, the shock absorber 1 can prevent or reduce the disturbance (the variation) of the damping force characteristic.

Figure 9:
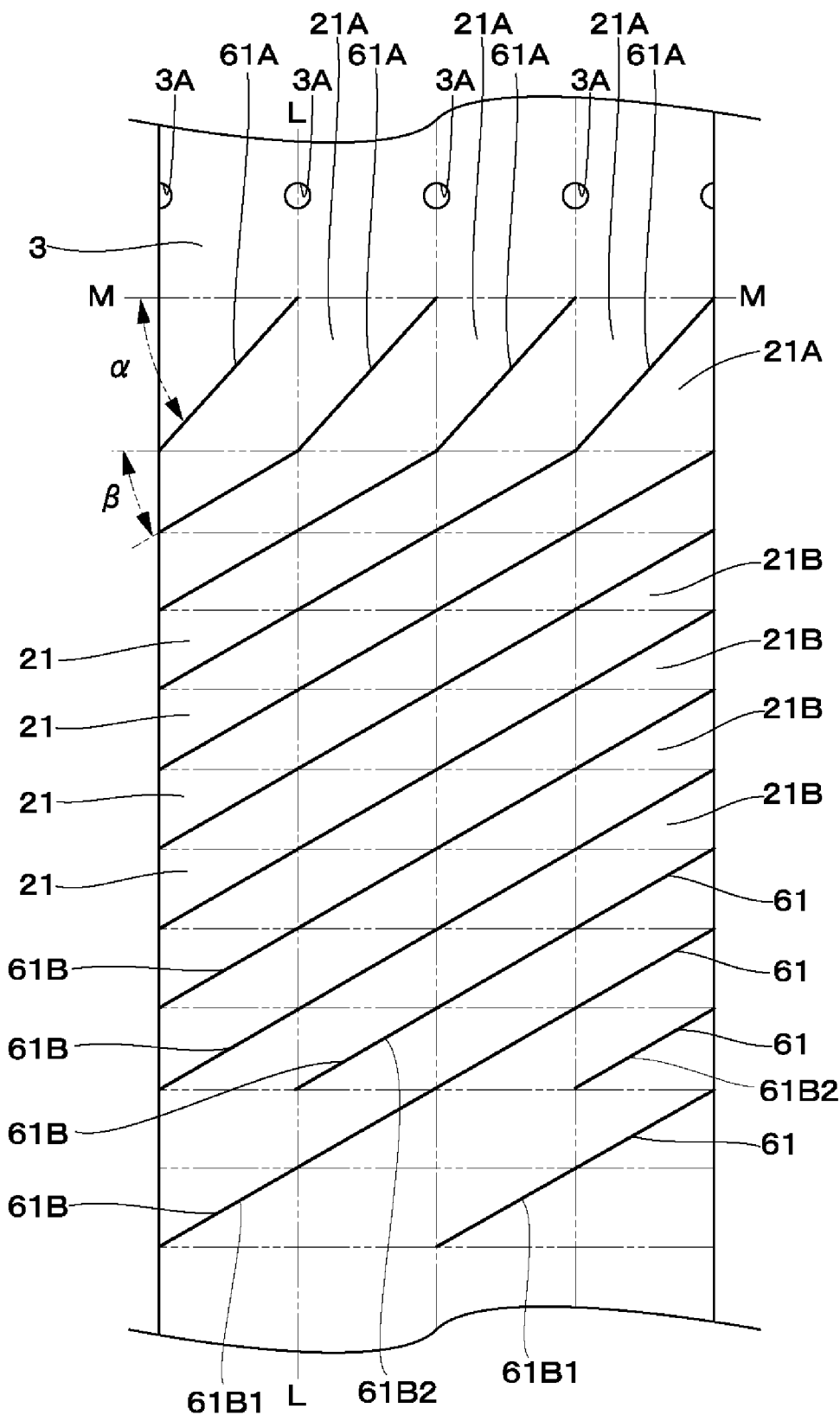
FIG. 9 illustrates an inner cylinder and a seal unit according to a sixth embodiment in the developed manner.

Next, FIG. 9 illustrates a sixth embodiment. The sixth embodiment is characterized by being configured in such a manner that the number of flow passage formation units (seal units) provided at the exit is small compared to the number of flow passage formation units (seal units) provided on the entrance side of the flow passage. The sixth embodiment will be described, indicating similar components to the first embodiment by the same reference numerals and omitting descriptions thereof.

A partition wall 61 as the seal unit (the flow passage formation unit) includes a sharply inclined portion 61A on the entrance side and a mildly inclined portion 61B at the intermediate portion, and extends circumferentially obliquely between the inner cylinder 3 and the electrode cylinder 18. In the sixth embodiment, the shock absorber 1 is configured in such a manner that the number of partition walls 61 provided at the exit is small compared to the number of partition walls 61 provided on the entrance side of the flow passage 21. More specifically, among four mildly inclined portions 61B of the partition walls 61, two of them is prepared as long mildly inclined portions 61B1 having a long length, and the remaining two of them (i.e., two mildly inclined portions 61B each arranged between the long mildly inclined portions 61B1) are prepared as short mildly inclined portions 61B2 having a short length. Therefore, in the sixth embodiment, the number of partition walls 61 is two on the exit side while being four on the entrance side of the flow passage 21.

Therefore, in the sixth embodiment, the flow passage 21 has a large cross-sectional area at the exit (i.e., the flow passage cross-sectional area between the long mildly inclined portions 61B1) compared to the cross-sectional area of the flow passage 21 at the mildly inclined portion 61B1 for increasing the flow passage length (i.e., the flow passage cross-sectional area between the long mildly inclined portion 61B1 and the short mildly inclined portion 61B2), similarly to the fifth embodiment (and the third embodiment). In this case, the cross-sectional area change unit that increases the cross-sectional area of the flow passage 21 on the exit is formed by reducing the number of partition walls 61 provided on the exit compared to the number of partition walls 61 provided on the entrance side of the flow passage 21 (i.e., preparing two partition walls 61 on the exit while preparing four partition walls 61 on the entrance). In other words, the short mildly inclined portions 61B2, which are shorter partition walls 61 than the other partition walls 61, among the plurality of partition walls 61 correspond to the flow passage cross-sectional area change unit.

The sixth embodiment is configured to partition the flow passages 21 by the partition walls 61 (the sharply inclined portion 61A, the long mildly inclined portion 61B1, and the short mildly inclined portion 61B2) as described above, and a basic operation thereof is not especially different from the operations performed by the first, third, and fifth embodiments. Especially, according to the sixth embodiment, the flow passage 21 is provided with the flow passage cross-sectional area change unit at which the cross-sectional area of the flow passage 21 at the exit (the flow passage cross-sectional area between the long mildly inclined portions 61B1) increases compared to the cross-sectional area of the flow passage 21 at the mildly inclined portion 61B for increasing the flow passage length (the flow passage cross-sectional area between the long mildly inclined portion 61B1 and the short mildly inclined portion 61B2). In this case, the flow passage cross-sectional area change unit is formed by reducing the number of partition walls 61 provided on the exit compared to the number of partition walls 61 provided on the entrance side of the flow passage 21. In other words, in the sixth embodiment, the flow passage 21 is also provided in such a manner that the effective cross-sectional area between the long mildly inclined portions 61B1 serving as the exit of the flow passage 21 is large compared to the effective cross-sectional area between the long mildly inclined portion 61B1 and the short mildly inclined portion 61B2 located on the intermediate portion of the flow passage 21, similarly to the fifth embodiment (and the third embodiment).

According to the sixth embodiment configured in this manner, the hydraulic fluid 2 in the flow passage 21 is discharged from the electrode passage 19 into the reservoir chamber A via between the long mildly inclined portions 61B1 serving as the exit side (the downstream side), i.e., between the long mildly inclined portions 61B1 having the large flow passage cross-sectional area among the mildly inclined portions 61B of the partition walls 61. Due to this configuration, the hydraulic fluid 2 in the flow passage 21 flows at a lower speed by passing through between the long mildly inclined portions 61B1, and is discharged into the reservoir chamber A while flowing at the lower speed in this manner. Therefore, the shock absorber 1 can prevent or reduce the stirring of the hydraulic fluid 2 in the reservoir chamber A, thereby reducing the aeration. As a result, the shock absorber 1 can prevent or reduce the disturbance of the damping force characteristic.

Figure 10:
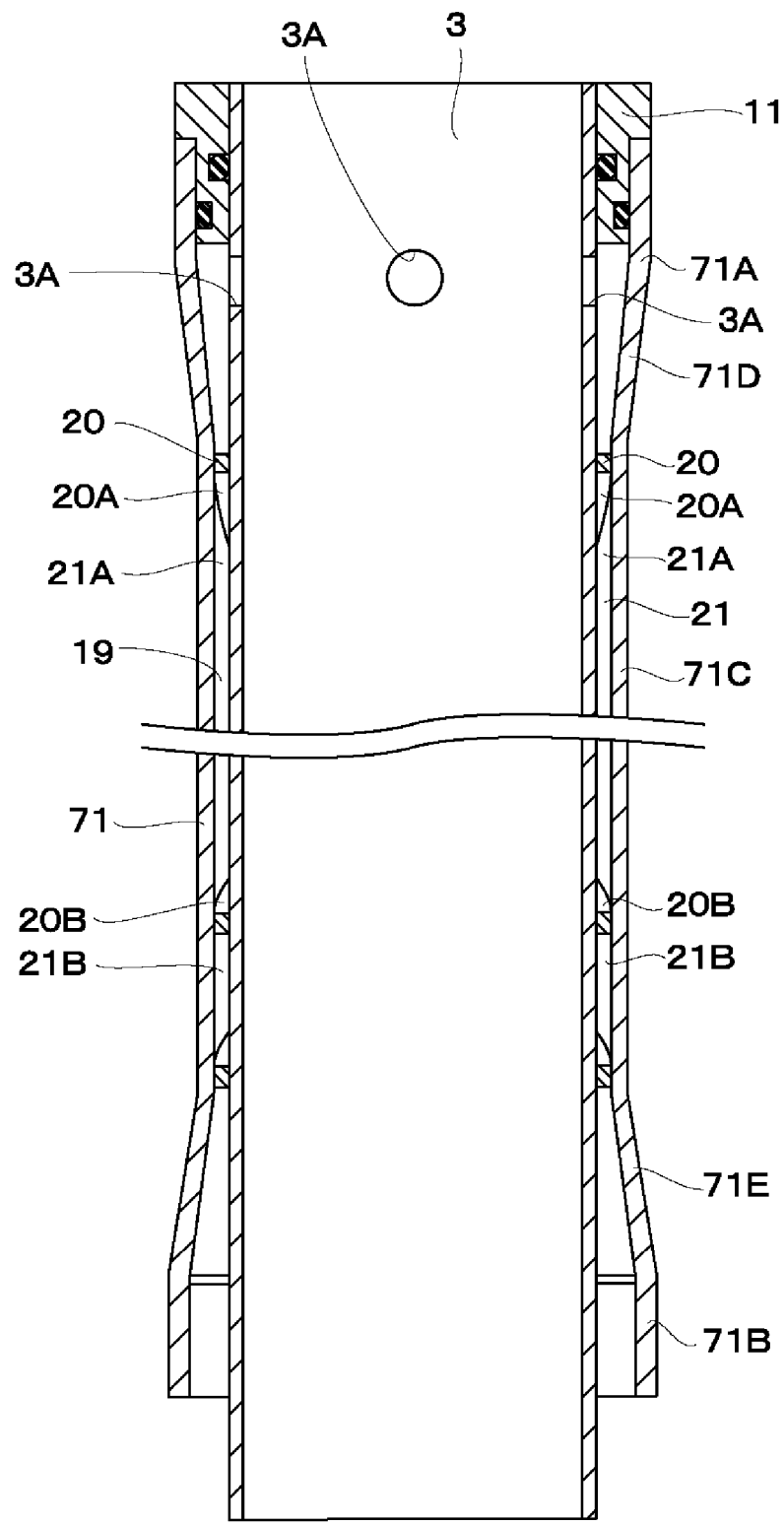
FIG. 10 is a vertical cross-sectional view illustrating an inner cylinder, an electrode cylinder, and a seal unit according to a seventh embodiment.

Next, FIG. 10 illustrates a seventh embodiment. The seventh embodiment is characterized by being configured in such a manner that the outer cylinder electrode partially flares. The seventh embodiment will be described, indicating similar components to the first embodiment by the same reference numerals and omitting descriptions thereof.

An electrode cylinder 71 as the outer cylinder electrode is used in the seventh embodiment instead of the electrode cylinder 18 in the first embodiment. The electrode cylinder 71 defines an annular passage inside the electrode cylinder 71 (between an inner peripheral side of the electrode cylinder 71 and the outer peripheral side of the inner cylinder 3), i.e., the electrode passage 19 through which the hydraulic fluid 2 flows by surrounding the outer peripheral side of the inner cylinder 3 along the entire circumference thereof. The plurality of flow passages 21 is formed in the electrode passage 19 (i.e., between the outer peripheral surface of the inner cylinder 3 and the inner peripheral surface of the electrode cylinder 71) by the plurality of partition walls 20.

The electrode cylinder 71 includes a one-side large-diameter cylindrical portion 71A, an opposite-side large-diameter cylindrical portion 71B, and an intermediate cylindrical portion 71C. The one-side large-diameter cylindrical portion 71A and the opposite-side large-diameter cylindrical portion 71B are located on both the axial end sides and have large inner diameter dimensions. The intermediate cylindrical portion 71C is located between these one-side large-diameter cylindrical portion 71A and opposite-side large-diameter cylindrical portion 71B, and has a small inner diameter dimension than the opposite-side large-diameter cylindrical portion 71B. Further, the one-side large-diameter cylindrical portion 71A and the intermediate cylindrical portion 71C are connected to each other via a one-side inclined cylindrical portion 71D therebetween, and the opposite-side large-diameter cylindrical portion 71B and the intermediate cylindrical portion 71C are connected to each other via an opposite-side inclined cylindrical portion 71E therebetween. In the seventh embodiment, the partition wall 20 is provided between an inner peripheral side of the intermediate cylindrical portion 71C in the electrode cylinder 71 and the outer peripheral side of the inner cylinder 3. In other words, the partition wall 20 is not provided between an inner peripheral side of the one-side large-diameter cylindrical portion 71A in the electrode cylinder 71 and the outer peripheral side of the inner cylinder 3, and between an inner peripheral side of the opposite-side large-diameter cylindrical portion 71B in the electrode cylinder 71 and the outer peripheral side of the inner cylinder 3. Further, the partition wall 20 is neither provided between an inner peripheral side of the one-side inclined cylindrical portion 71D and the outer peripheral side of the inner cylinder 3, and between an inner peripheral side of the opposite-side inclined cylindrical portion 71E and the outer peripheral side of the inner cylinder 3. The partition wall 20 includes, for example, the sharply inclined portion 20A and the mildly inclined portion 20B similarly to the first embodiment.

In the seventh embodiment configured in this manner, the flow passage 21 also has the large cross-sectional area at the exit (i.e., the flow passage cross-sectional area between the opposite-side inclined cylindrical portion 71E and the opposite-side large-diameter cylindrical portion 71B of the electrode cylinder 71, and the inner cylinder 3) compared to the cross-sectional area of the flow passage 21 of the mildly inclined portion 20B for increasing the flow passage length (i.e., the flow passage cross-sectional area between the mildly inclined portions 20B, more specifically, the flow passage cross-sectional area between the intermediate cylindrical portion 71C of the electrode cylinder 71 and the inner cylinder 3), similarly to the third, fifth, and sixth embodiments. In this case, the flow passage cross-sectional area change unit that increase the cross-sectional area of the flow passage at the exit is formed by causing the electrode cylinder 71 to partially flare, i.e., causing the electrode cylinder 71 to flare on the opposite end side thereof serving as the exit side of the flow passage 21. In other words, the opposite-side large-diameter cylindrical portion 71B (and the opposite-side inclined cylindrical portion 71E), which has a larger inner diameter dimension than the other portion (the intermediate cylindrical portion 71C) in the electrode cylinder 71, corresponds to the flow passage cross-sectional area change unit. Each of the specifications such as the inner diameter dimension of the intermediate cylindrical portion 71C of the electrode cylinder 71, the inner diameter dimension of the opposite-side large-diameter cylindrical portion 71B, the axial length of the opposite-side large-diameter cylindrical portion 71B, and the axial length of the opposite-side inclined cylindrical portion 71E can be set from, for example, an experiment, a calculation, or a simulation so as to be able to acquire the desired performance (the damping performance and the response performance) (i.e., so as to be able to prevent or reduce the disturbance of the damping force characteristic) according to the specifications, the dimensions, and the like of the shock absorber 1.

The seventh embodiment is configured to form the electrode passage 19 by the electrode cylinder 71 between the electrode cylinder 71 and the inner cylinder 3 as described above, and a basic operation thereof is not especially different from the operation performed by the first, third, fifth, and sixth embodiments. Especially, according to the seventh embodiment, the flow passage 21 is provided with the flow passage cross-sectional area change unit at which the cross-sectional area of the flow passage 21 at the exit (the flow passage cross-sectional area of the flow passage 21 between the opposite-side large-diameter cylindrical portion 71B and the opposite-side inclined cylindrical portion 71E of the electrode cylinder 71, and the inner cylinder 3) increases compared to the cross-sectional area of the flow passage 21 at the mildly inclined portion 20B for increasing the flow passage length (the flow passage cross-sectional area of the flow passage 21 between the intermediate cylindrical portion 71C of the electrode cylinder 71 and the inner cylinder 3). In this case, the flow passage cross-sectional area change unit is formed by causing the electrode cylinder 71 to partially flare. In other words, in the seventh embodiment, the flow passage 21 is also provided in such a manner that the effective cross-sectional area is large at the exit of the flow passage 21 compared to the effective cross-sectional area at the intermediate portion of the flow passage 21, similarly to the third, fifth, and sixth embodiments.

According to the seventh embodiment configured in this manner, the hydraulic fluid 2 in the flow passage 21 is discharged from the electrode passage 19 into the reservoir chamber A via between the opposite-side large-diameter cylindrical portion 71B (and the opposite-side inclined cylindrical portion 71E) of the electrode cylinder 71 having the large flow passage cross-sectional area, and the inner cylinder 3. Due to this configuration, the hydraulic fluid 2 in the flow passage 21 flows at a lower speed by passing through between the opposite-side large-diameter cylindrical portion 71B (and the opposite-side inclined cylindrical portion 71E) of the electrode cylinder 71 and the inner cylinder 3, and is discharged into the reservoir chamber A while flowing at the lower speed in this manner. Therefore, the shock absorber 1 can prevent or reduce the stirring of the hydraulic fluid 2 in the reservoir chamber A, thereby reducing the aeration. As a result, the shock absorber 1 can prevent or reduce the disturbance of the damping force characteristic.

Figure 11:
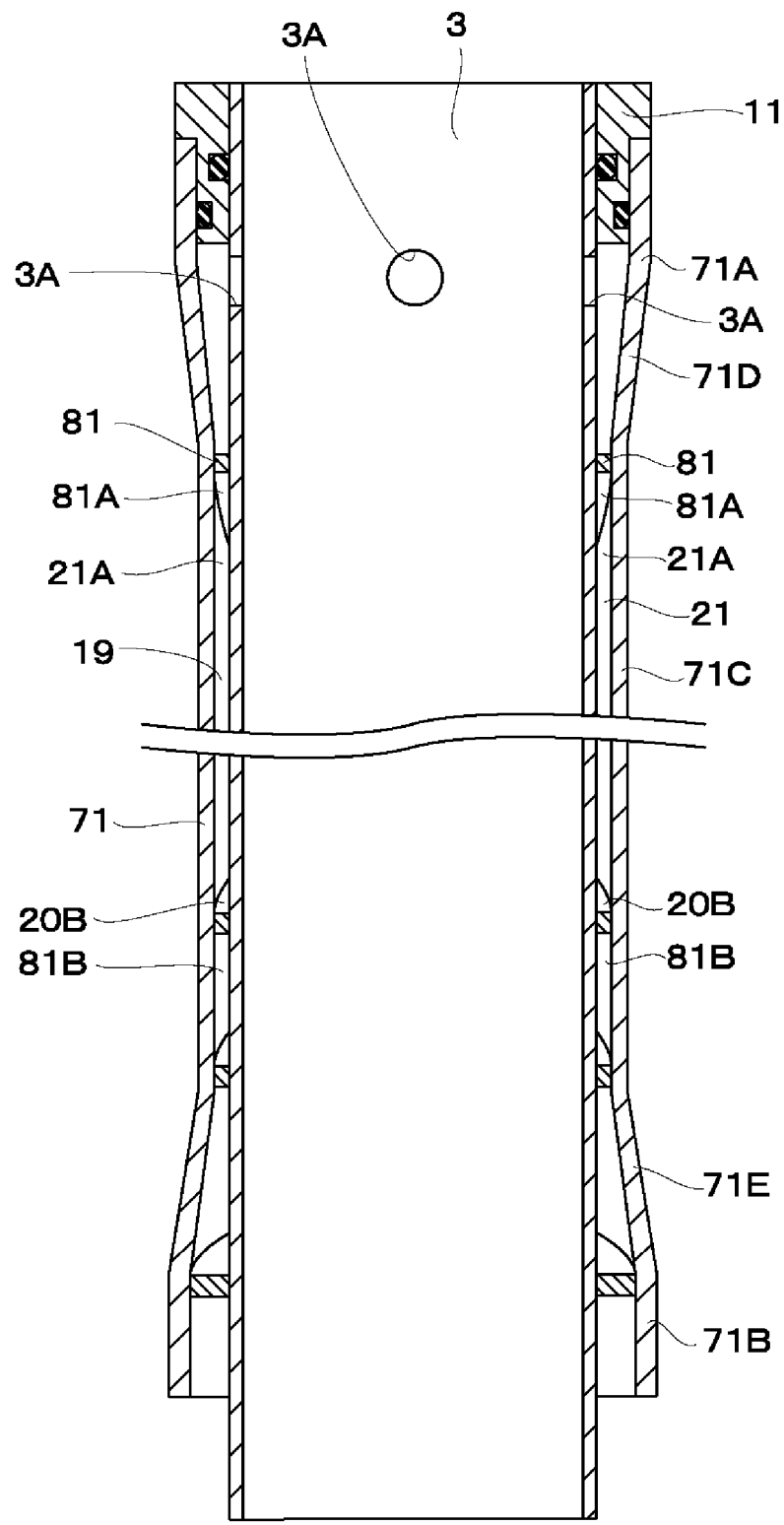
FIG. 11 is a vertical cross-sectional view illustrating an inner cylinder, an electrode cylinder, and a seal unit according to an eighth embodiment.

Next, FIG. 11 illustrates an eighth embodiment. The eighth embodiment is characterized by being configured in such a manner that the outer cylinder electrode partially flares and the flow passage formation unit (the seal unit) is also provided as far as this flaring portion. The eighth embodiment will be described, indicating similar components to the seventh embodiment by the same reference numerals and omitting descriptions thereof.

In the eighth embodiment, a partition wall 81 is provided between the inner peripheral side of the intermediate cylindrical portion 71C, the opposite-side (exit-side) inclined cylindrical portion 71E, and the opposite-side large-diameter cylindrical portion 71B in the electrode cylinder 71 and the outer peripheral side of the inner cylinder 3. In other words, the partition wall 81 is provided not only on the intermediate cylindrical portion 71C but also across from the intermediate cylindrical portion 71C to the opposite-end inclined cylindrical portion 71E and the opposite-side large-diameter cylindrical portion 71B on the inner peripheral side of the electrode cylinder 71. The partition wall 81 includes, for example, a sharply inclined portion 81A and a mildly inclined portion 81B similarly to the partition wall 20 according to the seventh embodiment. Then, the mildly inclined portion 81B extends as far as between the inner peripheral side of the opposite-side large-diameter cylindrical portion 71B and the outer peripheral side of the inner cylinder 3. In this case, the mildly inclined portion 81B increases the effective cross-sectional area by, for example, having a greater thickness dimension (height dimension) at a portion thereof corresponding to the opposite-side large-diameter cylindrical portion 71B of the electrode cylinder 71 than a thickness dimension (height dimension) at a portion thereof corresponding to the intermediate cylindrical portion 71C. In other words, in the eighth embodiment, the flow passage 21 is also formed between the opposite-side inclined cylindrical portion 71E and the opposite-side large-diameter cylindrical portion 71B and the inner cylinder 3 by gradually changing (changing little by little) the height of the partition wall 81 on the exit side to also provide the partition wall 81 between the inner peripheral sides of the opposite-side inclined cylindrical portion 71E and the opposite-side large-diameter cylindrical portion 71B of the electrode cylinder 71 and the outer peripheral side of the inner cylinder 3.

The eighth embodiment is configured to form the flow passage 21 by the electrode cylinder 71 and the partition wall 81 as described above, and a basic operation thereof is not especially different from the operation performed by the first, third, fifth, sixth, and seventh embodiments. Especially, in the eighth embodiment, the partition wall 81 extends not only between the inner peripheral side of the intermediate cylindrical portion 71C of the electrode cylinder 71 and the outer peripheral side of the inner cylinder 3 but also as far as between the inner peripheral sides of the opposite-side inclined cylindrical portion 71E and the opposite-side large-diameter cylindrical portion 71B and the outer peripheral side of the inner cylinder 3. Therefore, the flow passage 21 can be divided by the partition wall 81 as far as the exit of the flow passage 21 (i.e., as far as immediately before the reservoir chamber A). Due to this configuration, the flow of the hydraulic fluid 2 can be adjusted by the partition wall 81 as far as the exit of the flow passage 21.

In the seventh embodiment and the eighth embodiment, the shock absorber 1 has been described as being configured to omit the holding member serving as the isolator (for example, the holding member 17 illustrated in FIG. 1) between the opposite-side large-diameter cylindrical portion 71B formed as the flaring portion on the downstream side and the inner cylinder 3 by way of example. In other words, in the seventh embodiment and the eighth embodiment, the shock absorber 1 has been described as being configured to directly discharge the hydraulic fluid 2 from between the inner peripheral surface of the opposite-side large-diameter cylindrical portion 71B of the electrode cylinder 71 and the outer peripheral surface of the inner cylinder 3 into the reservoir chamber A by way of example. However, the shock absorber 1 is not limited thereto, and may be configured to, for example, include an isolator (a holding member) that is a different member from the outer cylinder electrode at the flaring portion of the outer cylinder electrode, and adjust the flow of the hydraulic fluid (the electrorheological fluid) on the exit side of the flow passage due to this isolator (holding member), more specifically, due to an oil passage provided at the isolator (the holding member). In other words, the shock absorber 1 may be configured to discharge the hydraulic fluid into the reservoir chamber A via the oil passage of the isolator (the holding member). Further, in an opposite manner therefrom, the shock absorber 1 according to the first to sixth embodiments may be configured to omit the isolator (the holding member), i.e., directly discharge the hydraulic fluid from between the inner peripheral surface of the outer cylinder electrode and the outer peripheral surface of the inner cylinder electrode.

In the fifth embodiment, the partition wall 41 has been described as being configured to include the one-end-side sharply inclined portion 41A, the opposite-end-side sharply inclined portion 41B, and the mildly inclined portion 41C by way of example. However, the partition wall 41 is not limited thereto, and, for example, may omit the one-end-side sharply inclined portion 41A. That is, for example, the partition wall may be formed by the mildly inclined portion on the entrance side and the sharply inclined portion on the exit side. In other words, the partition wall may be configured to include the sharply inclined portion inclined at a larger angle than the mildly inclined portion (i.e., for increasing the flow passage cross-sectional area) only at the portion corresponding to the exit of the flow passage.

In the sixth embodiment, the partition wall 61 has been described as being configured to include the sharply inclined portion 61A by way of example. However, the partition wall 61 is not limited thereto, and, for example, may be configured to omit the sharply inclined portion 61A and include only the mildly inclined portion 61B. In other words, for example, the partition wall may be formed by the mildly inclined portion including the long mildly inclined portion and the short mildly inclined portion.

In the sixth embodiment, the shock absorber 1 has been described as having the uniflow structure by way of example. However, the shock absorber 1 is not limited thereto, and, for example, may be configured as the bi-flow structure. In this case, for example, the sharply inclined portion 61A of the partition wall 61 may be configured in a similar manner to the downstream side of the mildly inclined portion 61B (configured to include a smaller number of partition walls). More specifically, for example, the partition wall can be formed by the mildly inclined portion including the long mildly inclined portion and the short mildly inclined portion, and also be configured to have a smaller number of partition walls on both the one end side and the opposite end side of the mildly inclined portion. In other words, the shock absorber 1 is configured to include a smaller number of flow passage formation units (seal units) on both the exit of the extension-side flow passage and the exit of the compression-side flow passage.

In the seventh embodiment and the eighth embodiment, the electrode cylinder 71 has been described as being configured to include the one-side large-diameter cylindrical portion 71A, the intermediate cylindrical portion 71C, and the opposite-side large-diameter cylindrical portion 71B by way of example. However, the electrode cylinder 71 is not limited thereto, and, for example, may omit the one-side large-diameter cylindrical portion 71A. More specifically, the outer electrode may be formed by a small-diameter cylindrical portion having a small inner diameter dimension on the entrance side and a large-diameter cylindrical portion having a greater inner diameter dimension than the small-diameter cylindrical portion on the exit side. In other words, the outer electrode may be configured to include the larger-diameter cylindrical portion having a greater inner diameter dimension (i.e., a larger flow passage cross-sectional area) only at the portion corresponding to the exit of the flow passage. In this case, an inclined cylindrical portion for smoothly connecting the small-diameter cylindrical portion and the large-diameter cylindrical portion to each other may be provided between the small-diameter cylindrical portion and the large-diameter cylindrical portion if necessary.

In the first embodiment, the shock absorber 1 has been described as being configured to include the four partition walls 20 as the flow passage formation units (the seal units) regulating the direction of the flow passage 21 by way of example. However, the shock absorber 1 is not limited thereto, and, for example, may be configured to include two or three partition walls or may be configured to include five or more partition walls. In this case, the number of partition walls can be appropriately set according to a required performance (the damping performance), manufacturing cost, the specifications, and the like. The same also applies to the second to eighth embodiments.

In the first embodiment, the shock absorber 1 has been described as being configured to form the plurality of flow passages 21 with use of the plurality of partition walls 20 by way of example. However, the shock absorber 1 is not limited thereto, and, for example, may be configured to form one flow passage with use of one partition wall (one seal unit or one flow passage formation unit). The same also applies to the second to eighth embodiments.

In the first embodiment, the shock absorber 1 has been described assuming that the flow passage 21 is provided as the helical flow passage by way of example. However, the shock absorber 1 is not limited thereto, and, for example, the flow passage 21 may be provided as a serpentine flow passage. More specifically, in the first embodiment, the partition wall 20 is helically shaped, and evenly circles in the same direction across from the upper end side to the lower end side of the inner cylinder 3. To modify it, for example, the partition wall may be configured to be folded back at an intermediate portion thereof (the circling direction is reversed at the intermediate portion, or changed from the clockwise direction to the counterclockwise direction or from the counterclockwise direction to the clockwise direction at the intermediate portion). The same also applies to the second to eighth embodiments.

In the first embodiment, the partition wall 20 has been described as being made from the synthetic rubber by way of example. However, the partition wall 20 is not limited thereto, and, for example, may be formed with use of a polymer material other than the synthetic rubber such as synthetic resin. Further, various kinds of materials capable of forming the flow passage can also be employed besides the polymer material. In any case, the seal unit (the flow passage formation unit) forming the partition wall is made from an insulative material having an electric insulation property. The same also applies to the second to eighth embodiments.

In the first embodiment, the partition wall 20 has been described as being provided so as to be fixedly attached to the outer peripheral side of the inner cylinder 3 by way of example. However, the partition wall is not limited thereto, and, for example, may be configured to be provided so as to be fixedly attached to the inner peripheral side of the intermediate cylinder (the electrode cylinder). The same also applies to the second to eighth embodiments.

In the first embodiment, the shock absorber 1 has been described as being configured in such a manner that the partition wall 20 is provided between the inner cylinder 3 and the electrode cylinder 18, i.e., the flow passage 21 is formed between the inner cylinder 3 and the electrode cylinder 18 by way of example. However, the shock absorber 1 is not limited thereto, and, for example, the flow passage may be provided between the intermediate cylinder (the electrode cylinder) and the outer cylinder. In other words, the partition wall may be provided between the intermediate cylinder (the electrode cylinder) and the outer cylinder. In this case, the partition wall can be provided so as to be fixedly attached to the outer peripheral surface of the intermediate cylinder (the electrode cylinder) or the inner peripheral surface of the outer cylinder. The same also applies to the second to eighth embodiments.

In the first embodiment, the shock absorber 1 has been described as having the uniflow structure by way of example. However, the shock absorber 1 is not limited thereto, and, for example, may be configured as the bi-flow structure. The same also applies to the second and fourth to eighth embodiments.

In the second embodiment, the sharply inclined portion 31A of the partition wall 31 has been described as being configured to include the two inclined portions, the first inclined portion 31B and the second inclined portion 31C inclined at the different angles from each other with the first bent portion 31D sandwiched therebetween. However, the sharply inclined portion is not limited thereto, and, for example, may be configured to include three or more inclined portions inclined at different angles from one another due to two or more bent portions. In this case, the plurality of inclined portions forming the sharply inclined portion can be inclined more largely (sharply) as the inclined portion is located closer to the entrance side of the flow passage (the entrance side in the direction in which the fluid flows). In other words, the angle defined with the imaginary line (the perpendicular line) in the direction perpendicular to the axis of the outer cylinder electrode (the intermediate cylinder) can be increased as the inclined portion is located closer to the entrance side.

In the third embodiment, the shock absorber 1 has been described as being configured in such a manner that the sharply inclined portions 41A and 41B are provided on both the axial sides of the flow passage 21 (i.e., both the axial end portions of the mildly inclined portion 41C), respectively, and the one-end-side sharply inclined portion 41A and the opposite-end-side sharply inclined portion 41B each include no bent portion (each of them includes one inclined portion) by way of example. However, the shock absorber 1 is not limited thereto, and, for example, may be configured in such a manner that each of the one-end-side sharply inclined portion and/or the opposite-end-side sharply inclined portion includes a plurality of inclined portions inclined at different angles from each other due to a bent portion. The same also applies to the fifth embodiment.

In the third embodiment, the sharply inclined portions 41A and 41B have been described as being configured to extend obliquely with respect to the axial direction of the electrode cylinder 18. However, the sharply inclined portion is not limited thereto, and, for example, may be configured to extend in parallel with the axial direction of the outer cylinder electrode, like the sharply inclined portion 51A according to the fourth embodiment illustrated in FIG. 7. Further, the sharply inclined portion may be configured to include the first inclined portion 31B and the second inclined portion 31C, like the sharply inclined portion 31A according to the second embodiment illustrated in FIG. 5. More specifically, the sharply inclined portion may be configured to include a portion extending obliquely with respect to the axial direction of the outer cylinder electrode. Further, the sharply inclined portion may be configured to include a portion extending in parallel with the axial direction of the outer cylinder electrode. Further, the sharply inclined portion may be configured to be divided into a plurality of portions with a boundary therebetween lying at a bent portion. In this case, the bent portion may be prepared as a curved connection portion. The same also applies to the fifth embodiment.

In the third embodiment, the shock absorber 1 has been described as being configured in such a manner that the angle $\alpha$ defined by the one-end side sharply inclined portion 41A (the angle $\alpha$ defined with the imaginary line M-M in the direction perpendicular to the axis K-K of the electrode cylinder 18) and the angle $\alpha'$ defined by the opposite-end-side sharply inclined portion 41B (the angle $\alpha'$ defined with the imaginary line M-M in the direction perpendicular to the axis K-K of the electrode cylinder 18) are set to the same angle as each other. However, the shock absorber 1 is not limited thereto, and, for example, may be configured in such a manner that the defined angle $\alpha$ and the defined angle $\alpha'$ are set to different angles from each other. In other words, the angle defined by the one-end-side sharply inclined portion and the angle defined by the opposite-end-side sharply inclined portion can be set individually separately. The same also applies to the fifth embodiment.

In each of the embodiments, the shock absorber 1 has been described as being configured to be arranged vertically by way of example. However, the shock absorber 1 is not limited thereto, and, for example, may be arranged in a desired direction according to an object on which the shock absorber 1 is mounted, such as being arranged while being tilted within a range that does not cause the aeration.

In each of the embodiments, the shock absorber 1 has been described assuming that the inner cylinder 3 is set as the inner cylinder electrode and the electrode cylinder 18 is set as the outer cylinder electrode by way of example. However, the shock absorber 1 is not limited thereto, and may be configured in such a manner that the electrode cylinder is set as the inner cylinder electrode and the outer cylinder is set as the outer cylinder electrode. In other words, the shock absorber 1 may be configured in a different manner as long as cylinders radially adjacent to each other serve as electrodes of different potentials from each other. For example, the cylinder apparatus may be formed by two cylinders, an inner cylinder and an outer cylinder, and use these inner cylinder and outer cylinder as the inner cylinder electrode and the outer cylinder electrode, respectively.

In the first embodiment, the shock absorber 1 has been described as being configured in such a manner that the hydraulic fluid 2 flows from the axial upper end side (the one end side) to the axial lower end side (the opposite end side). However, the shock absorber 1 is not limited thereto, and, for example, may be configured in such a manner that the hydraulic fluid flows an opposite axial end side to one axial end side, such as flowing from the lower end side toward the upper end side, flowing from a left end side (or a right end side) to the right end side (or the left end side), and flowing from a front end side (or a rear end side) to the rear end side (or the front end side) according to a direction in which the shock absorber 1 is arranged. The same also applies to the second and fourth to eighth embodiments.

In each of the embodiments, the shock absorber 1 has been described assuming that the hydraulic fluid 2 as the functional fluid is embodied by the electrorheological fluid (the ER fluid) by way of example. However, the shock absorber 1 is not limited thereto, and, for example, the hydraulic fluid as the functional fluid may be embodied with use of magnetic fluid (MR fluid) having a fluid property changing according to a magnetic field. In the case where the magnetic fluid is used, the shock absorber 1 can be configured to use the electrode cylinder 18 provided as the intermediate cylinder as a magnetic pole corresponding to the electrode (i.e., apply a magnetic field from a magnetic field supply portion to a magnetic pole cylinder that is the intermediate cylinder). In this case, for example, the magnetic field is variably controlled when the magnetic field is generated between the inner cylinder (the inner cylinder electrode) and the magnetic pole cylinder (the outer cylinder electrode) (in a magnetic passage therebetween) by the magnetic field supply portion and the generated damping force is variably adjusted. Further, the holding members 11 and 17 and the like for insulation may be made from, for example, non-magnetic materials.

In each of the embodiments, the shock absorber 1 as the cylinder apparatus has been described assuming that it is used together with the four-wheeled automobile by way of example. However, the shock absorber 1 is not limited thereto, and can be widely used as various kinds of shock absorbers (the cylinder apparatus) that absorb a shock on an object on which the shock should be absorbed, such as a shock absorber for use in a two-wheeled vehicle, a shock absorber for use in a railway train, a shock absorber for use in various kinds of equipment and machinery including general industrial machinery, and a shock absorber for use in a building. Further, each of the embodiments is only an example, and it is apparent that the configurations indicated in the different embodiments can be partially replaced or combined. In other words, the design of the cylinder apparatus (the shock absorber) can be changed within a range that does not depart from the spirit of the present invention.

Possible configurations as the cylinder apparatus based on the above-described embodiments include the following examples.

According to a first configuration, a cylinder apparatus sealingly contains functional fluid having a fluid property changing according to an electric field, and includes a rod inserted therein. The cylinder apparatus includes an inner cylinder electrode and an outer cylinder electrode provided outside this inner cylinder electrode. The inner cylinder electrode and the outer cylinder electrode serve as electrodes of potentials different from each other. The cylinder apparatus further includes one or a plurality of flow passage formation unit(s) provided between the inner cylinder electrode and the outer cylinder electrode. The one or plurality of flow passage formation unit(s) form(s) a plurality of flow passages through which the functional fluid flows at least according to an extension-side movement of the rod from one end side toward an opposite end side in an axial direction. The flow passages formed by the one or plurality of flow passage formation unit(s) are each a helical or serpentine flow passage having a circumferentially extending portion, and provided in such a manner that an effective cross-sectional area of the flow passage on at least one of an entrance and an exit is large compared to an effective cross-sectional area of an intermediate portion of this flow passage. According to this first configuration, the cylinder apparatus can prevent or reduce disturbance of a damping force characteristic. More specifically, the cylinder apparatus can reduce a flow speed of the functional fluid at the entrance and/or the exit of the flow passage where the flow passage has the large effective cross-sectional area. As a result, the cylinder apparatus can achieve both securement of a damping force variable range and stabilization of a waveform of a damping force.

According to a second configuration, in the first configuration, the flow passage formation unit(s) is(are) one or a plurality of seal unit(s) provided so as to be inclined at some inclination angle with respect to the axial direction. The inclination angle of each of the seal unit(s) is not constant, and a sharply inclined portion inclined at a large inclination angle is provided at least on an entrance of an extension-side flow passage. According to this second configuration, the cylinder apparatus can prevent or reduce the disturbance of the damping force characteristic. More specifically, the cylinder apparatus can adjust a flow of the functional fluid flowing into the flow passage due to the sharply inclined portion. As a result, the cylinder apparatus can also achieve both the securement of the damping force variable range and the stabilization of the waveform of the damping force in this regard.

According to a third configuration, in the second configuration, the sharply inclined portion includes a portion extending obliquely with respect to an axial direction of the outer cylinder electrode. According to this third configuration, the cylinder apparatus can adjust the flow of the functional fluid due to the portion extending obliquely with respect to the axial direction.

According to a fourth configuration, in the second or third configuration, the sharply inclined portion includes a portion extending in parallel with the axial direction of the outer cylinder electrode. According to this fourth configuration, the cylinder apparatus can adjust the flow of the functional fluid due to the portion extending in parallel with the axial direction.

According to a fifth configuration, in any of the second to fourth configurations, each of the seal unit(s) includes a bent portion at an intermediate portion thereof. The sharply inclined portion is divided into a plurality of portions with a boundary therebetween lying at the bent portion. According to this fifth configuration, the cylinder apparatus can further finely set (adjust) the flow of the functional fluid flowing along the sharply inclined portion.

According to a sixth configuration, in any of the second to fifth configurations, the sharply inclined portion is provided on both the entrance side of the extension-side flow passage and an entrance side of a compression-side flow passage. According to this sixth configuration, a cylinder apparatus having a bi-flow structure can adjust the flow of the functional fluid due to the sharply inclined portion on the entrance side of the flow passage both when the rod is extended and when the rod is compressed.

According to a seventh configuration, in the fifth configuration, the bent portion is formed as a curved connection portion. According to this seventh configuration, the cylinder apparatus can further prevent or reduce the disturbance of the damping force characteristic.

According to an eighth configuration, in the first configuration, the outer cylinder electrode partially flares. According to this eighth configuration, the cylinder apparatus can reduce the flow speed of the functional fluid flowing out from the flow passage due to the flaring portion of the outer cylinder electrode.

According to a ninth configuration, in the first configuration, the number of the flow passage formation unit(s) provided on the exit is small compared to the number of the flow passage formation unit(s) at the intermediate portion of the flow passage. According to this eighth configuration, the cylinder apparatus can reduce the flow speed of the functional fluid flowing out from the flow passage due to the portion where the number of seal units is small.

According to a tenth configuration, in the first configuration, the effective cross-sectional area is changed by changing an angle of each of the flow passage formation unit(s). According to this tenth configuration, the cylinder apparatus can change the effective cross-sectional area of the flow passage as desired by changing the angle of the flow passage formation unit. For example, the effective cross-sectional area at the entrance and/or the exit of the flow passage can be increased compared to the effective cross-sectional area at the intermediate portion of the flow passage by inclining the flow passage formation unit forming the entrance and/or the exit of the flow passage at a larger angle than the angle of the flow passage formation unit forming the intermediate portion of the flow passage.

REFERENCE SIGN LIST 1 shock absorber (cylinder apparatus)
2 hydraulic fluid (functional fluid)
3 inner cylinder (inner cylinder electrode)
4 outer cylinder
9 piston rod (rod)
18, 71 electrode cylinder (outer cylinder electrode)
20, 31, 41, 51, 61, 81 partition wall (flow passage formation unit, seal unit)
20A, 31A, 51A, 61A, 81A sharply inclined portion
20B, 31E, 41C, 51B, 61B, 81B mildly inclined portion
21 flow passage
31D first bent portion (bent portion)
31F second bent portion (bent portion)
41A one-end-side sharply inclined portion (sharply inclined portion)
41B opposite-end-side sharply inclined portion (sharply inclined portion, flow passage cross-sectional area change unit)
41D one-end-side bent portion (bent portion)
41E opposite-end-side bent portion (bent portion)
51C bent portion
61B2 short mildly inclined portion (flow passage cross-sectional area change unit)
71B opposite-end large-diameter cylindrical portion (flow passage cross-sectional area change unit)

The invention claimed is:

1. A cylinder apparatus sealingly containing functional fluid having a fluid property changing according to an electric field, the cylinder apparatus including a rod inserted therein, the cylinder apparatus comprising:
    an inner cylinder electrode and an outer cylinder electrode provided outside this inner cylinder electrode, the inner cylinder electrode and the outer cylinder electrode serving as electrodes of potentials different from each other; and
    one or a plurality of flow passage formation unit(s) provided between the inner cylinder electrode and the outer cylinder electrode, the one or plurality of flow passage formation unit(s) forming a plurality of flow passages through which the functional fluid flows at least according to an extension-side movement of the rod from one end side toward an opposite end side in an axial direction,
    wherein the flow passages formed by the one or plurality of flow passage formation unit(s) are each a helical or serpentine flow passage having a circumferentially extending portion, and provided in such a manner that an effective cross-sectional area of the flow passage on at least one of an entrance and an exit is large compared to an effective cross-sectional area of an intermediate portion of this flow passage,
    wherein the flow passage formation unit(s) comprise(s) one or a plurality of seal unit(s) provided so as to be inclined at some inclination angle with respect to the axial direction, and
    wherein the inclination angle of each of the seal unit(s) is not constant, and a sharply inclined portion inclined at a large inclination angle is provided at least on an entrance of an extension-side flow passage.

2. The cylinder apparatus according to claim 1, wherein the sharply inclined portion includes a portion extending obliquely with respect to an axial direction of the outer cylinder electrode.

3. The cylinder apparatus according to claim 1, wherein the sharply inclined portion includes a portion extending in parallel with the axial direction of the outer cylinder electrode.

4. The cylinder apparatus according to any of claim 1, wherein each of the seal unit(s) includes a bent portion at an intermediate portion thereof, and
    wherein the sharply inclined portion is divided into a plurality of portions with a boundary therebetween lying at the bent portion.

5. The cylinder apparatus according to any of claim 1, wherein the sharply inclined portion is provided on both the entrance side of the extension-side flow passage and an entrance side of a compression-side flow passage.

6. The cylinder apparatus according to claim 4, wherein the bent portion is formed as a curved connection portion.

7. The cylinder apparatus according to claim 1, wherein the outer cylinder electrode partially flares.

8. The cylinder apparatus according to claim 1, wherein the number of the flow passage formation unit(s) provided on the exit is less than the number of the flow passage formation unit(s) at the intermediate portion of the flow passage.

9. The cylinder apparatus according to claim 1, wherein the effective cross-sectional area is changed by changing an angle of each of the flow passage formation unit(s).

* * * * *